US011488305B2

(12) United States Patent
Arai et al.

(10) Patent No.: US 11,488,305 B2
(45) Date of Patent: Nov. 1, 2022

(54) SEGMENTATION DEVICE

(71) Applicants: NIHON UNIVERSITY, Tokyo (JP); J. MORITA MFG. CORP., Kyoto (JP)

(72) Inventors: Yoshinori Arai, Tokyo (JP); Yuu Nishimura, Kyoto (JP); Hideki Yoshikawa, Kyoto (JP); Tomoyuki Sadakane, Kyoto (JP)

(73) Assignees: NIHON UNIVERSITY, Tokyo (JP); J. MORITA MFG. CORP., Kyoto (JP)

( * ) Notice: Subject to any disclaimer, the term of this patent is extended or adjusted under 35 U.S.C. 154(b) by 0 days.

(21) Appl. No.: 17/064,531

(22) Filed: Oct. 6, 2020

(65) Prior Publication Data

US 2021/0104039 A1   Apr. 8, 2021

(30) Foreign Application Priority Data

Oct. 7, 2019  (JP) .............................. JP2019-184673

(51) Int. Cl.
| G06T 7/00 | (2017.01) |
| G06T 7/11 | (2017.01) |
| G06N 3/04 | (2006.01) |
| G06N 3/08 | (2006.01) |

(52) U.S. Cl.
CPC ......... *G06T 7/0012* (2013.01); *G06N 3/0454* (2013.01); *G06N 3/08* (2013.01); *G06T 7/11* (2017.01); *G06T 2207/10081* (2013.01)

(58) Field of Classification Search
CPC ............. G06T 7/0012; G06T 7/11; G06T 2207/10081; G06T 2207/10088; G06T 2207/20081; G06T 2207/20084; G06T 2207/30008; G06T 2207/30036; G06T 2207/30052; G06T 2207/30101; G06T 2207/30201; G06N 3/0454; G06N 3/08
USPC ........................................................ 382/128
See application file for complete search history.

(56) References Cited

U.S. PATENT DOCUMENTS

| 2007/0128573 A1* | 6/2007 | Kuo ..................... A61C 7/08 |
| | | 433/24 |
| 2009/0162813 A1* | 6/2009 | Glor .................. A61C 13/0004 |
| | | 433/196 |
| 2016/0106520 A1* | 4/2016 | Borovinskih .......... A61C 7/002 |
| | | 705/2 |
| 2017/0084026 A1* | 3/2017 | Kim ....................... G06T 17/10 |
| 2020/0320685 A1* | 10/2020 | Anssari Moin ...... G06V 10/454 |
| 2021/0150702 A1* | 5/2021 | Claessen .............. G06T 17/10 |
| 2021/0174543 A1* | 6/2021 | Claessen ............... A61C 9/004 |

FOREIGN PATENT DOCUMENTS

| JP | H8-215192 A | 8/1996 |
| WO | 2019/002631 A1 | 1/2019 |

OTHER PUBLICATIONS

Search Report from the corresponding European Patent Application No. 20200327.3 dated Mar. 9, 2021.

\* cited by examiner

*Primary Examiner* — Van D Huynh
(74) *Attorney, Agent, or Firm* — Shinjyu Global IP

(57) ABSTRACT

A learning model provided in a segmentation device is a learning model which is generated using training data such that segmentation data of a biologically important region is output when data of a constituent maxillofacial region is input.

19 Claims, 20 Drawing Sheets

*Fig.5A* *Fig.5B*
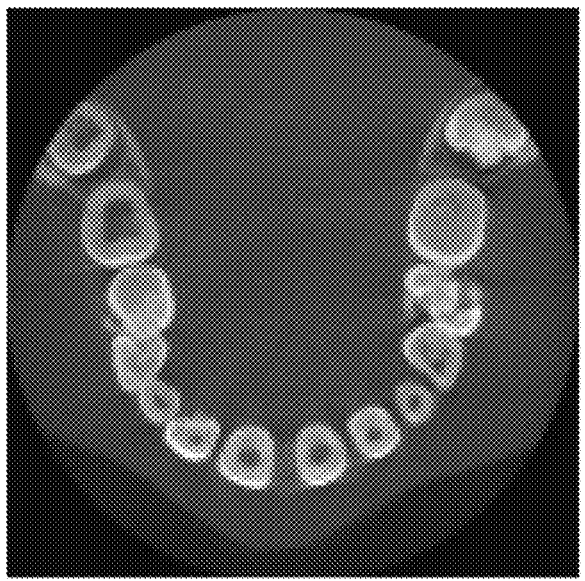 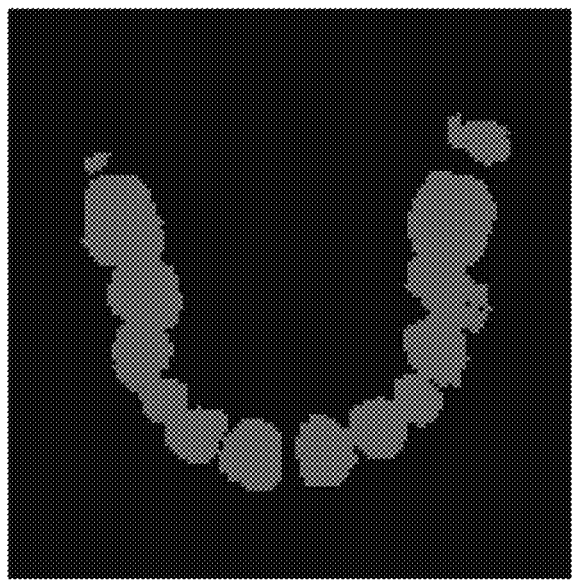

SEGMENTATION DEVICE

CROSS-REFERENCE TO RELATED APPLICATIONS

This application claims priority to Japanese Patent Application No. 2019-184673, filed Oct. 7, 2019. The contents of that application are incorporated by reference herein in their entirety.

TECHNICAL FIELD

The present disclosure relates to a segmentation device.

BACKGROUND ART

Technology of performing segmentation on an image or the like obtained by an X-ray CT scan (for example, see Japanese Unexamined Patent Publication No. H8-215192) is known.

BRIEF SUMMARY

In the related art, segmentation of a biological tissue in a medical image has been mathematically performed on the basis of CT values, concentration values, or the like. In this case, there is a problem in that it is difficult to segment tissues with close CT values, concentration values, or the like. A person's intervention (determination) is required for segmentation in consideration of an influence of conditions at the time of imaging or variables such as individual differences. Accordingly, there is demand for improvement in segmentation accuracy without requiring a person's intervention.

An objective of the present disclosure is to provide a segmentation device that can improve segmentation accuracy.

According to an aspect of the present disclosure, there is provided a segmentation device including: an input unit configured to receive an input of data of a maxillofacial region or a constituent maxillofacial region which is a partial region of a maxillofacial part; a calculation unit configured to perform segmentation of a biologically important region using the data of the constituent maxillofacial region input to the input unit and a previously generated learning model, and to calculate a three-dimensional position of the biologically important region in the constituent maxillofacial region; and an output unit configured to output information based on a result of calculation from the calculation unit. The learning model is a learning model which is generated using training data such that segmentation data of the biologically important region is output when the data of the constituent maxillofacial region is input. The data of the constituent maxillofacial region is image data which is acquired by an X-ray CT scan or an MRI scan of the constituent maxillofacial region. The biologically important region is at least one region of blood vessels, neural tubes, and a mandibular canal passing through the constituent maxillofacial region and a biological tissue passing through the mandibular canal.

With this segmentation device, segmentation of a biologically important region is performed using a constituent maxillofacial region and a previously generated learning model. The learning model is a learning model which is generated using training data such that segmentation data of the biologically important region is output when the data of the constituent maxillofacial region is input. The data of the constituent maxillofacial region is image data which is acquired by an X-ray CT scan or an MRI scan of the constituent maxillofacial region. Accordingly, it is possible to segment a biologically important region from image data acquired by an X-ray CT scanner or an MRI scanner. By performing segmentation using the learning model in this way, a likelihood of improvement in segmentation accuracy increases, for example, in comparison with a case in which segmentation is mathematically performed on the basis of a CT value, a concentration value, or the like. With improvement in accuracy, a likelihood of a person's intervention not being required also increases.

The learning model may be a learning model which is generated using the training data such that segmentation data of a region of interest in a biologically normal region which is a region outside of the biologically important region in the constituent maxillofacial region is additionally output when the data of the constituent maxillofacial region is input, and the calculation unit may be configured to perform segmentation of the region of interest. Accordingly, it is possible to segment the region of interest from the constituent maxillofacial region.

The calculation unit may be configured to calculate three-dimensional positional relationship information between the biologically important region and the region of interest. Accordingly, it is possible to understand a three-dimensional positional relationship between the biologically important region and the region of interest.

The region of interest may be at least one region of a tooth region, a region which is occupied by an artifact implanted in the tooth region, a boundary region between a jawbone and the tooth region, a boundary region between the jawbone and the artifact, and an alveolar region, and the learning model may be a learning model which is generated using the training data such that segmentation data of each region of interest is output when the data of the constituent maxillofacial region is input. Accordingly, it is possible to segment each region of interest from the constituent maxillofacial region.

The learning model may include: a first learning model which is generated using first training data such that segmentation data of a tooth region is output when the data of the constituent maxillofacial region is input; and a second learning model which is generated using second training data such that segmentation data of the biologically important region is output when the data of the constituent maxillofacial region and the segmentation data of the tooth region are input. The calculation unit may be configured to acquire the segmentation data of the tooth region using the data of the constituent maxillofacial region input to the input unit and the first learning model, and to perform segmentation of the biologically important region using the acquired segmentation data of the tooth region, the data of the constituent maxillofacial region input to the input unit, and the second learning model. By using the first learning model and the second learning model in combination in this order, the likelihood of improvement in segmentation accuracy increases further in comparison with a case in which the learning models are independently used. Particularly, since segmentation is performed with a focus on the tooth region, it is possible to further improve segmentation accuracy more than when segmentation is performed along with other regions.

The second learning model may be a learning model which is generated using the second training data such that segmentation data of the biologically important region is output when at least one of a panoramic tomographic image along a curve of a dental arch and a cross-section image crossing the curve is input, and the calculation unit may be configured to set a spline curve for the segmentation data of the tooth region acquired using the first learning model, to generate at least one of a panoramic tomographic image along the set spline curve and a cross-section image crossing the set spline curve, and to perform segmentation of the biologically important region using the generated image and the second learning model. Accordingly, it is possible to segment a biologically important region in a panoramic tomographic image, a cross-section image, or the like. A biologically important region (blood vessels, neural tubes, a mandibular canal, a biological tissue passing through the mandibular canal) is visibly presented in images such as a tomographic image and a cross-section image.

The calculation unit may be configured to calculate a distance between the region of interest and the biologically important region as an inter-element distance. Accordingly, it is possible to calculate a specific distance between a region of interest and a biologically important region.

The output unit may be configured to display information of the inter-element distance calculated by the calculation unit. Accordingly, it is possible to acquire information of an inter-element distance.

The learning model may include a third learning model which is generated using third training data such that the inter-element distance is output when the segmentation data of the tooth region and the segmentation data of the biologically important region are input, and the calculation unit may be configured to calculate the inter-element distance using the segmentation data of the tooth region, the segmentation data of the biologically important region, and the third learning model. By calculating the inter-element distance using the third learning model in this way, it is possible to increase a likelihood of improvement in calculation accuracy of the inter-element distance.

The calculation unit may be configured to calculate a difficulty level of an implant treatment or a difficulty level of tooth extraction in accordance with the inter-element distance. Accordingly, it is possible to understand a difficulty level of an implant treatment or a difficulty level of tooth extraction.

Information of an implant may be additionally input to the input unit, and the calculation unit may be configured to calculate a distance between the implant and the biologically important region when the implant is implanted on the basis of the information of the implant input to the input unit. The distance calculated in this way can be used as a matter for determination of an implant treatment.

The output unit may be configured to issue an alarm when a position of the implant when the implant is implanted is close to the biologically important region or overlaps the biologically important region. Accordingly, it is possible to notify of a risk of an implant treatment.

The output unit may be configured to present information of an implant which is usable on the basis of a result of calculation from the calculation unit. Accordingly, it is possible to propose an implant which is suitable for an implant treatment.

The calculation unit may be configured to additionally generate an image of a biologically normal region, and the output unit may be configured to present a synthetic image of the image of the biologically normal region generated by the calculation unit and an image of the segmentation data of the biologically important region. Accordingly, an image in which both a biologically normal region and a biologically important region are presented can be used as a matter for determination of an implant treatment.

The input unit may be configured to receive an input of a user's operation of designating a treatment target position, the output unit may be configured to present an indicator of the treatment target position in an image of the constituent maxillofacial region according to the designated treatment target position, and the calculation unit may be configured to calculate a positional relationship between the biologically important region and the indicator of the treatment target position. Accordingly, a positional relationship between a treatment target position designated by a user and a biologically important region can be used as a matter for determination of an implant treatment.

The input unit may be configured to receive an operation of moving the indicator. Accordingly, it is possible to easily change an indicator of a treatment target position.

The indicator of the treatment target position may be an indicator of an implant. Accordingly, it is possible to calculate a positional relationship between a biologically important region and an implant.

The calculation unit may be configured to calculate a distance between the indicator of the treatment target position and the biologically important region as the inter-element distance. Accordingly, it is possible to calculate a specific distance between a treatment target position and a biologically important region.

The output unit may be configured to issue an alarm when the indicator of the treatment target position is close to the biologically important region by less than the inter-element distance or overlaps the biologically important region. Accordingly, it is possible to notify of a risk of an implant treatment.

The output unit may be configured to present information of an implant which is usable on the basis of the result of calculation from the calculation unit. Accordingly, it is possible to propose an implant which is suitable for an implant treatment.

According to the present disclosure, it is possible to provide a segmentation device that can improve segmentation accuracy.

BRIEF DESCRIPTION OF THE DRAWINGS

FIGS. 5A and 5B are diagrams illustrating an example of training data;

DETAILED DESCRIPTION

Figure 1:
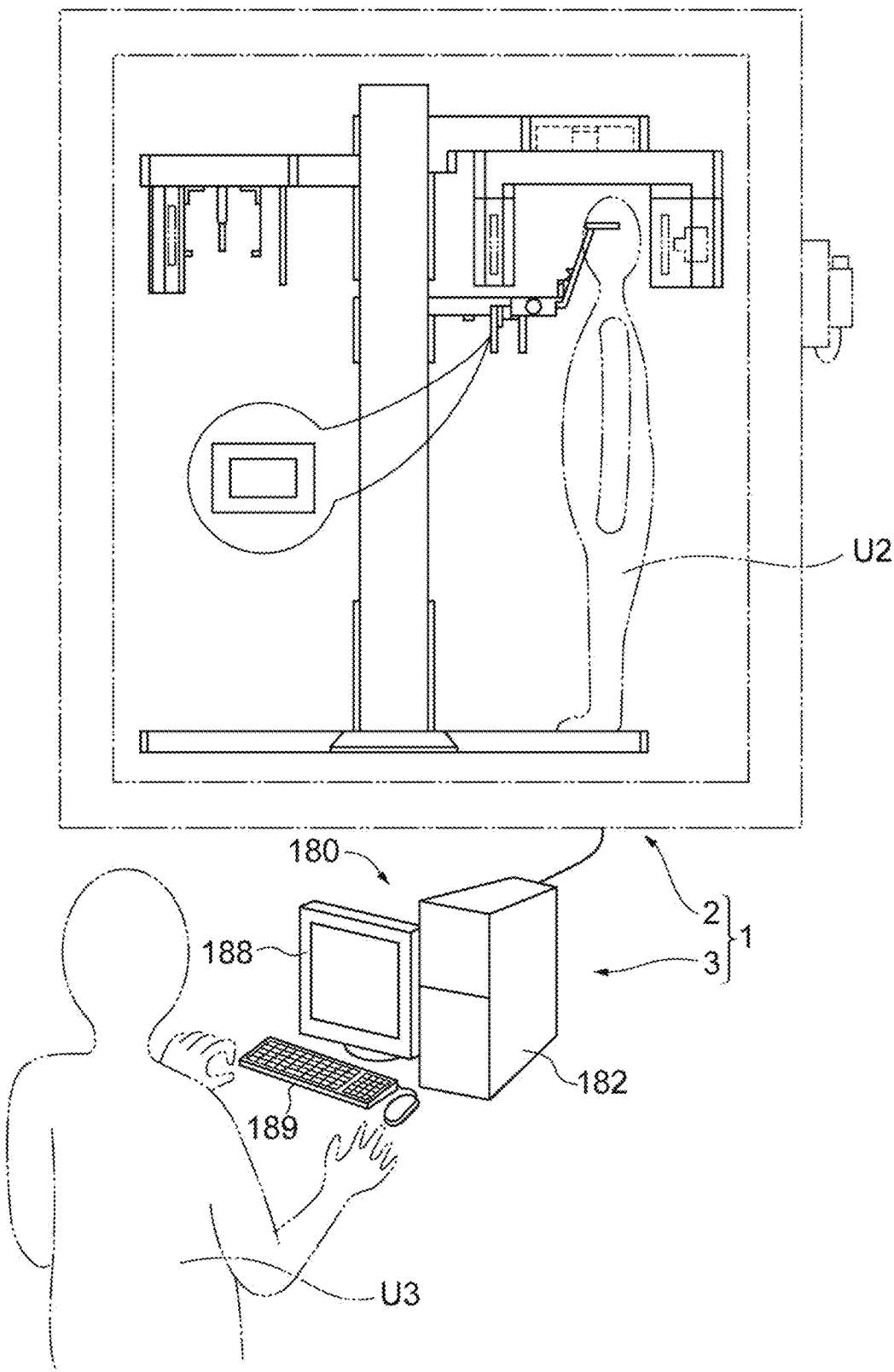
FIG. 1 is a diagram schematically illustrating a segmentation device.

Hereinafter, embodiments of the present disclosure will be described with reference to the accompanying drawings. In the drawings, the same elements will be referred to by the same reference signs and description thereof will not be repeated.

FIG. 1 is a diagram schematically illustrating a segmentation device according to an embodiment. In this example, the segmentation device is a constituent element of a segmentation system. The segmentation system 1 includes an imaging device 2 and the segmentation device 3. A user of the imaging device 2 is referred to and illustrated as a user U2. A user of the segmentation device 3 is referred to and illustrated as a user U3. The imaging device 2 and the segmentation device 3 are configured such that data acquired by the imaging device 2 is used by the segmentation device 3. Use of such data may be realized through unidirectional communication from the imaging device 2 to the segmentation device 3, bidirectional communication between the imaging device 2 and the segmentation device 3, or the like.

Examples of the imaging device 2 include an X-ray CT scanner and an MRI scanner. When the imaging device 2 is an X-ray CT scanner, the imaging device 2 performs an X-ray CT scan on the user U2. When the imaging device 2 is an MRI scanner, the imaging device 2 performs an MRI scan on the user U2. An imaging object is a constituent maxillofacial region of the user U2. The constituent maxillofacial region is a maxillofacial part or a partial region of the maxillofacial part. The maxillofacial region is the jaw region including the upper and lower tooth regions and the mouth. A partial region of the maxillofacial part is a partial region of the maxillofacial region. Examples of the partial region of the maxillofacial part include the upper and lower tooth regions and the jaw region serving to support teeth. The imaging device 2 acquires data of the constituent maxillofacial region through imaging. The data acquired by the imaging device 2 is set (input) to the segmentation device 3.

The data which is acquired by the imaging device 2 and input to the segmentation device 3 may be projection data. Reconfiguration data, slice image data, volume-rendered image data, or the like may be input to the segmentation device 3. The reconfiguration data, the slice image data, and the volume-rendered image data may be obtained by processing projection data. Such data is data (image data) which is acquired through an X-ray CT scan or an MRI scan. In this embodiment, image data which is acquired through an X-ray CT scan or an MRI scan may be referred to as captured image data.

In this embodiment, primary image data which is acquired through an X-ray CT scan or an MRI scan by the imaging device 2 or the like is referred to as captured raw image data. Data which is acquired by processing captured raw image data is referred to as captured processed image data. For example, when the captured raw image data is projection data, three-dimensional image data, reconfiguration data, slice image data, volume-rendered image data, and the like which are acquired by processing the projection data are examples of captured processed image data. Projection data may be preprocessed and the preprocessed image data may be additionally processed into three-dimensional image data, reconfiguration data, slice image data, volume-rendered image data, or the like. The preprocessed image data in this case is an example of captured processed image data. The captured image data includes the captured raw image data and the captured processed image data.

Captured image data may not be data which is imaged by the imaging device 2. The captured image data has only to be data which can be processed by the segmentation device 3 and may be data which is imaged by another imaging device. That is, data which is imaged by another imaging device and stored in a recording medium may be input to the segmentation device 3 as captured image data.

The captured image data may be captured raw image data or image data derived from the captured raw image data. The captured image data may be captured processed image data or image data derived from the captured processed image data.

Some or all processing of the captured raw image data may be performed by the imaging device 2 or may be performed by the segmentation device 3. Some or all processing of the captured raw image data may be shared by the imaging device 2 and the segmentation device 3.

Some or all additional processing of the captured processed image data may be performed by the imaging device 2 or may be performed by the segmentation device 3. Some or all additional processing of the captured processed image data may be shared by the imaging device 2 and the segmentation device 3.

The reconfiguration data includes data for reproducing a current state of an imaging region of a subject by processing projection data. This data may be two-dimensional image data or may be three-dimensional image data. An example of two-dimensional image data is slice image data. An example of three-dimensional image data is volume data or volume-rendered image data. The reconfiguration data represents, for example, a measured value for each voxel. An example of the measured value is a CT value. The slice image data may be a plurality of slice images (a slice image group). The reconfiguration data is formed using projection data, for example, on the basis of a known method. An example of a data format which is input to the segmentation device 3 is digital imaging and communications in medicine (DICOM). An arbitrary combination of projection data, reconfiguration data, a slice image, and the like may be input to the segmentation device 3.

The segmentation device 3 performs segmentation on data of a constituent maxillofacial region acquired by the imaging device 2. Segmentation includes distinguishment, identification, and the like of a biologically important region which is included in the constituent maxillofacial region. A biologically important region is a region of at least one of blood vessels, neural tubes, a mandibular canal passing through the constituent maxillofacial region, and a biological tissue passing through the mandibular canal. Segmentation is also referred to as "clustering," "labeling," or the like. For example, by segmentation of reconfiguration data, the tissue in the constituent maxillofacial region that each voxel corresponds to is identified. A result of segmentation in this case may be data in which each voxel (a voxel number, XYZ coordinate values, or the like) and information for identifying a tissue (for example, blood vessels, neural tubes, a mandibular canal, and a biological tissue passing through a mandibular canal) are associated with each other.

The segmentation device 3 performs the segmentation and calculates a three-dimensional position of a biologically important region in the constituent maxillofacial region. Information based on a result of calculation is presented to the user U3. An example of the information which is presented to the user U3 will be described below with reference to FIG. 2.

Figure 2:
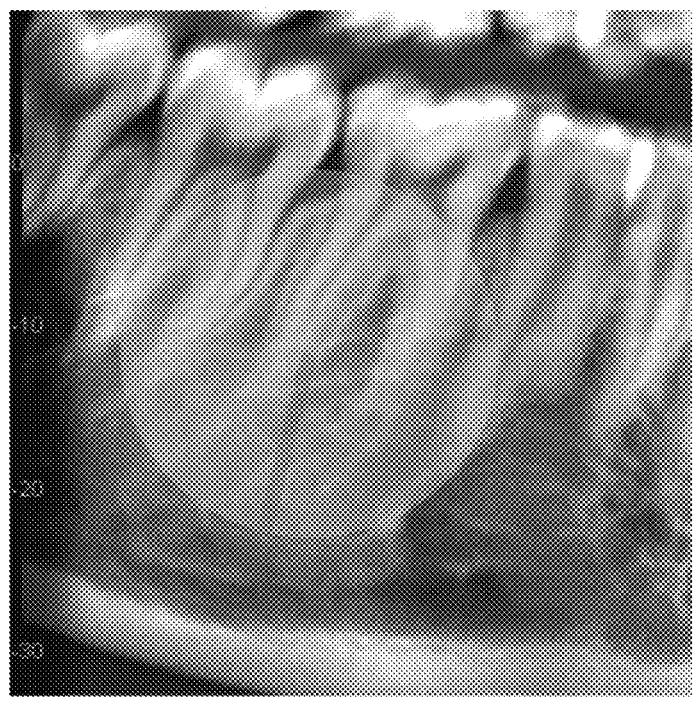
FIG. 2 is a diagram illustrating an example of output information.

FIG. 2 illustrates a sectional image of a constituent maxillofacial region of a user U2 when seen from a substantially horizontal direction. In this example, a biologically important region is the mandibular canal. A region (a circular area in this example) including teeth and the mandibular canal is highlighted (is presented brighter than the surroundings) and a straight line connecting a tooth to the mandibular canal at a shortest distance is presented. This straight line connects a root apex of the tooth to the mandibular canal. This straight line indicates a position of the mandibular canal with respect to the root apex of the tooth. A sectional image at a position at which the shortest distance is illustrated may be selected and presented.

Referring back to FIG. 1, the segmentation device 3 may be a computer device including a processor (such as a CPU) and a memory (such as a ROM and a RAM). The computer device can include an input interface that directly or indirectly receives data from the imaging device 2 and receives an operation of the user U3 and an output interface that presents information such as a result of segmentation to the user U3. In the example illustrated in FIG. 1, a main body 182 of a computer device 180 constituting the segmentation device 3 includes a processor and a memory. A keyboard 189 of the computer device 180 or a connection portion of the main body 182 to a communication cable from the imaging device 2 corresponds to the input interface. A display 188 of the computer device 180 corresponds to the output interface.

Figure 3:
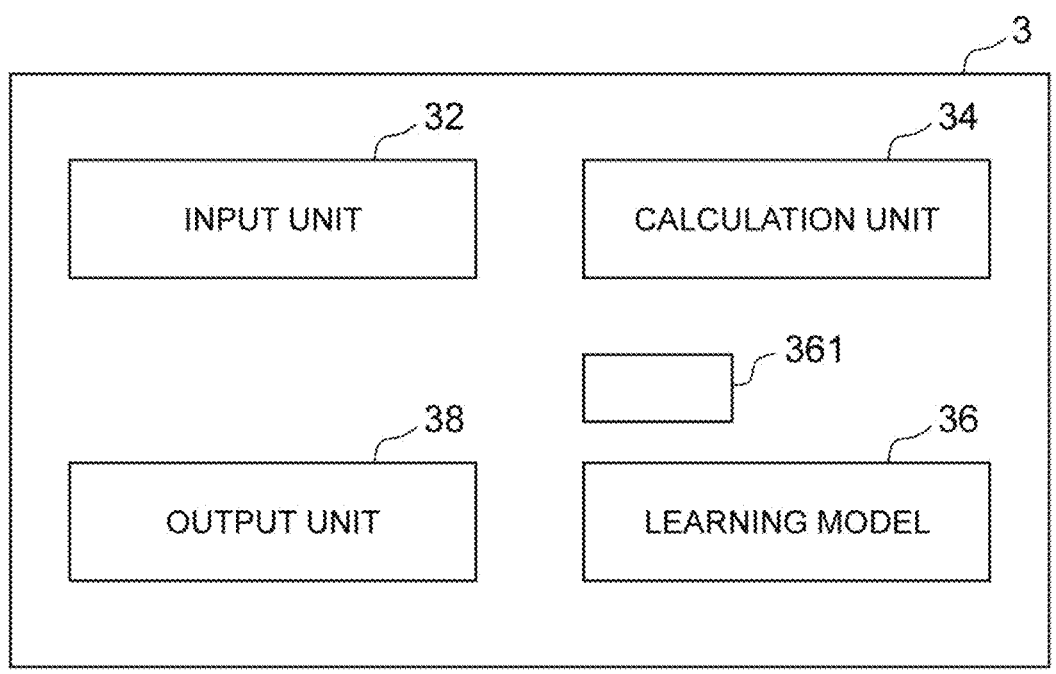
FIG. 3 is a diagram illustrating an example of functional blocks of the segmentation device.

FIG. 3 is a diagram illustrating an example of functional blocks of the segmentation device. The segmentation device 3 includes an input unit 32, a calculation unit 34, a learning model 36, and an output unit 38.

The input unit 32 is a unit (input means) that receives an input of data of a constituent maxillofacial region. The input unit 32 may be configured, for example, to have a function of the input interface. The input interface which receives the physical operation of the user such as keyboard or mouse and so on can be called as "physical interface".

The calculation unit 34 is a unit (execution means) that performs segmentation of a biologically important region using data input to the input unit 32 and the learning model 36.

The calculation unit 34 inputs data to the learning model 36. Data which is input to the learning model 36 may be data of a constituent maxillofacial region which is input to the input unit 32 or may be data derived from the data of the constituent maxillofacial region input to the input unit 32. The data derived therefrom may be preprocessed data. Examples of preprocessing include convolution, pooling, and trimming. The data derived therefrom may be data which is input to the learning model 36 and output from the learning model 36 once or more.

A learning model input unit 361 that receives an input of captured image data of a constituent maxillofacial region and sends the captured image data of the constituent maxillofacial region to the learning model 36 may be provided in the segmentation device 3. The learning model 36 may be connected to the learning model input unit 361. The input unit 32 may also serve as the learning model input unit 361. Alternatively, the learning model input unit 361 and the input unit 32 may be separately provided. When the learning model input unit 361 and the input unit 32 are separately provided, for example, data input to the input unit 32 may not be processed and automatically input to the learning model input unit 361. Alternatively, the calculation unit 34 may process the captured image data input to the input unit 32 and automatically input the processed captured image data to the learning model input unit 361.

For example, projection data which is acquired by the imaging device 2 may be input to the input unit 32 of the segmentation device 3. Then, the calculation unit 34 may generate processed image data such as reconfiguration data, slice image data, and volume-rendered image data by processing the projection data. The processed image data may be automatically input to the learning model 36 via the learning model input unit 361. The captured image data which is input to the input unit 32 may be captured raw image data or captured processed image data. The captured image data which is input to the learning model input unit 361 may be captured raw image data or captured processed image data.

Data which is input to the input unit 32 or the learning model input unit 361 may include, for example, accessory information data of captured image data such as a tube current or a tube voltage at the time of capturing the image.

The calculation unit 34 is a unit (calculation means) that performs the above-mentioned segmentation and calculates a three-dimensional position of a biologically important region in a constituent maxillofacial region. A three-dimensional position is identified, for example, by coordinates of reconfiguration data. The calculation unit 34 may also calculate a three-dimensional position of a region of interest in a biologically normal region. The biologically normal region is a region outside of a biologically important region in a constituent maxillofacial region. The region of interest is at least one region of a tooth region, a region which is occupied by an artifact (a metallic prosthesis or the like) implanted into the tooth region, a boundary region between a jawbone and the tooth region, a boundary region between the jawbone and the artifact, and an alveolar region. The tooth region may be a region of a specific (for example, single) tooth. The calculation unit 34 may generate three-dimensional positional relationship information between the biologically important region and the biologically normal region from the calculated three-dimensional position of the biologically important region and the calculated three-dimensional position of the biologically normal region. The calculation unit 34 may calculate (output or generate) three-dimensional positional relationship information between the biologically important region and the region of interest from the calculated three-dimensional position of the biologically important region and the calculated three-dimensional position of the region of interest. An example of the three-dimensional positional relationship information is an inter-element distance. An example of the inter-element distance is a distance between the region of interest in the biologically normal region and the biologically important region. A region outside of the region of interest in the biologically normal region can be called as a region of non-interest.

An example of a method of calculating the inter-element distance will be described below. For example, the calculation unit 34 calculates a distance between a surface of a tooth and a surface of the mandibular canal. The distance to the mandibular canal may be calculated for each voxel of the teeth. The learning model 36 may be used to calculate the inter-element distance.

The three-dimensional positional relationship information is not limited to the inter-element distance. For example, the three-dimensional positional relationship information may be two points serving as measurement points of the inter-element distance (such as one point on the surface of the tooth and one point on the mandibular canal). The three-dimensional positional relationship information may be a difficulty level of a treatment. The difficulty level of a treatment is a difficulty level in a treatment such as tooth extraction or implanting, which will be described later with reference to FIGS. 15A to 20B.

The learning model 36 is a learning model which was generated in advance. The learning model 36 which has been updated after the segmentation device 3 was manufactured is also an example of a learning model which was generated in advance. The learning model 36 is generated (trained) using training data such that segmentation data of a biologically important region is output when data of the constituent maxillofacial region is input.

Training of the learning model 36 may be machine learning (training) using training data. Machine learning can use various techniques such as an SVM, a neural network, and deep learning. When the learning model 36 includes a neural network, the learning model 36 may be a trained model including parameters of an intermediate layer of the neural network which has been tuned using training data.

The training data may include first training data. The first training data is training data in which data of a constituent maxillofacial region and segmentation data of a region of interest in a biologically normal region are associated with each other. When the region of interest is a tooth region (which may be a region of a specific tooth), the first training data may be training data in which data of a constituent maxillofacial region and segmentation data of the tooth region (that is, segmentation data for each region of interest) are associated with each other. By training the learning model 36 using the first training data, the learning model 36 is configured to output segmentation data of the region of interest in the biologically normal region when at least the data of the constituent maxillofacial region is input.

The training data may include second training data. The second training data is training data in which data of a constituent maxillofacial region and segmentation data of a biologically important region are associated with each other. By training the learning model 36 using the second training data, the learning model 36 is configured to output segmentation data of the biologically important region when at least the data of the constituent maxillofacial region is input. In the data of the constituent maxillofacial region, the tooth region may be segmented. When the tooth region in the data of the constituent maxillofacial region is segmentation data, for example, it is possible to easily set a spline curve along a curve of a dental arch as will be described later with reference to FIGS. 11A to 11C.

The second training data may be training data in which at least one of a panoramic tomographic image along the curve of the dental arch and a cross-section image crossing the curve and segmentation data of a biologically important region are associated with each other. By training the learning model 36 using the second training data, the learning model 36 is configured to output at least segmentation data of the biologically important region when at least one of the panoramic tomographic image along the curve of the dental arch and the cross-section image crossing the curve is input.

The training data may include third training data. The third training data is training data in which segmentation data of a biologically important region and information of a three-dimensional position of the biologically important region in the constituent maxillofacial region are associated with each other. The third training data may be training data in which segmentation data of a region of interest in a biologically normal region and segmentation data of a biologically important region are associated with three-dimensional positional relationship information (the above-mentioned inter-element distance, or the like). By training the learning model 36 using the third training data, the learning model 36 is configured to output at least the information of the three-dimensional position of the biologically important region when the segmentation data of the biologically important region is input. The learning model 36 is also configured to output three-dimensional positional relationship information when the segmentation data of a region of interest in the biologically normal region and the segmentation data of the biologically important region are input. The region of interest may be, for example, a tooth region. The third training data may be training data in which a virtual implant data and segmentation data of a biologically important region are associated with three-dimensional positional relationship information (the above-mentioned inter-element distance, or the like). By training the learning model 36 using the third training data, the learning model 36 is configured to output at least the information of the three-dimensional position of the biologically important region when the virtual implant data is input. The learning model 36 is also configured to output three-dimensional positional relationship information when the virtual implant data and the segmentation data of the biologically important region are input.

The third training data may include information indicating a distance between points to which a technical expert or a dentist pays attention. The third training data may be, for example, training data in which a mandibular molar and the mandibular canal are associated with each other. The learning model 36 which has been generated using the third training data is configured to output three-dimensional positional relationship information in a mode which is preferable for a technical expert or a dentist.

When training of the learning model 36 is performed using a plurality of pieces of training data, only one learning model may be prepared and training of the same learning model using a plurality of different pieces of training data may be performed. Alternatively, a plurality of learning models corresponding to the respective pieces of training data may be prepared and training using training data corresponding to the learning models may be performed. The latter will be described below with reference to FIGS. 4A and 4B.

Figure 4A:
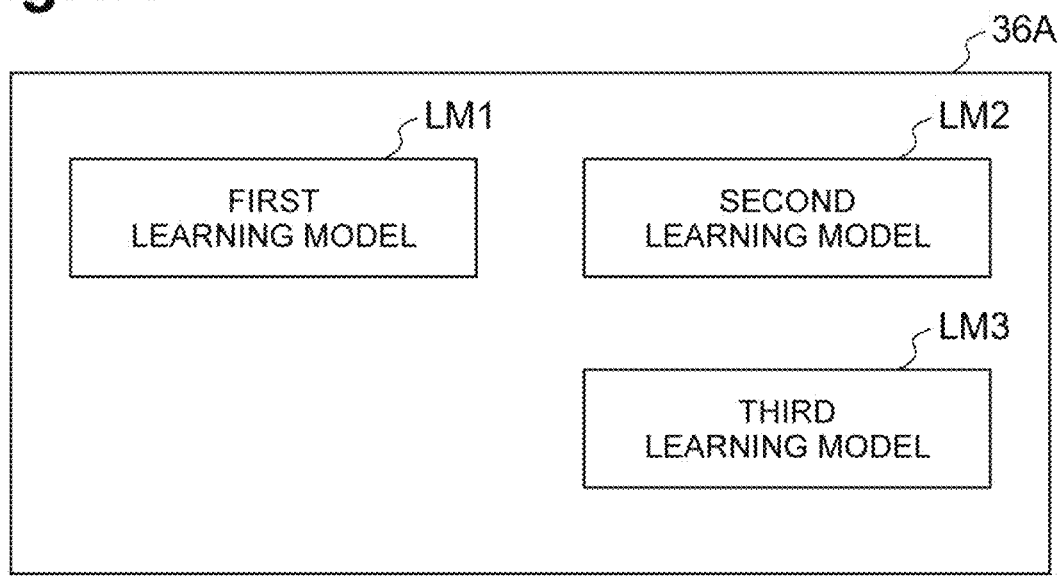
FIGS. 4A and 4B are diagrams illustrating an example of functional blocks of the segmentation device.

A learning model 36A illustrated in FIG. 4A includes a learning model LM1, a learning model LM2, and a learning model LM3.

The learning model LM1 is a first learning model which is generated using the first training data such that segmentation data of a region of interest in a biologically normal region is output when data of a constituent maxillofacial region is input. The region of interest may be, for example, a tooth region. The data of the constituent maxillofacial region may be input to the input unit 32 or the learning model input unit 361.

The learning model LM2 is a second learning model which is generated using the second training data such that segmentation data of a biologically important region is output when the data of the constituent maxillofacial region is input. The data of the constituent maxillofacial region may be input to the input unit 32 or the learning model input unit 361. When the second training data is the training data in which at least one of a panoramic tomographic image along the curve of the dental arch and a cross-section image crossing the curve and segmentation data of a biologically important region are associated with each other, the learning model LM2 is generated to output the segmentation data of the biologically important region when at least one of the panoramic tomographic image along the curve of the dental arch and the cross-section image crossing the curve is input.

The learning model LM3 is a third learning model which is generated using the third training data such that a three-dimensional position of a biologically important region in the constituent maxillofacial region is identified and the identified information of the three-dimensional position is output when data of the constituent maxillofacial region and the segmentation data of the biologically important region acquired using the learning model LM2 are input. The data of the constituent maxillofacial region may be input to the input unit 32 or the learning model input unit 361. The learning model LM3 may be configured to output three-dimensional positional relationship information between the region of interest and the biologically important region when segmentation data of the region of interest (for example, the tooth region) in the biologically normal region acquired using the learning model LM1 is input along with the segmentation data of the biologically important region. The three-dimensional positional relationship information may be, for example, inter-element distance information. The learning model LM3 may be configured to output three-dimensional positional relationship information between a virtual implant and the biologically important region when virtual implant data is input along with the segmentation data of the biologically important region.

The learning model may include a learning model for processes other than segmentation in addition to the learning models for segmentation.

Figure 4B:
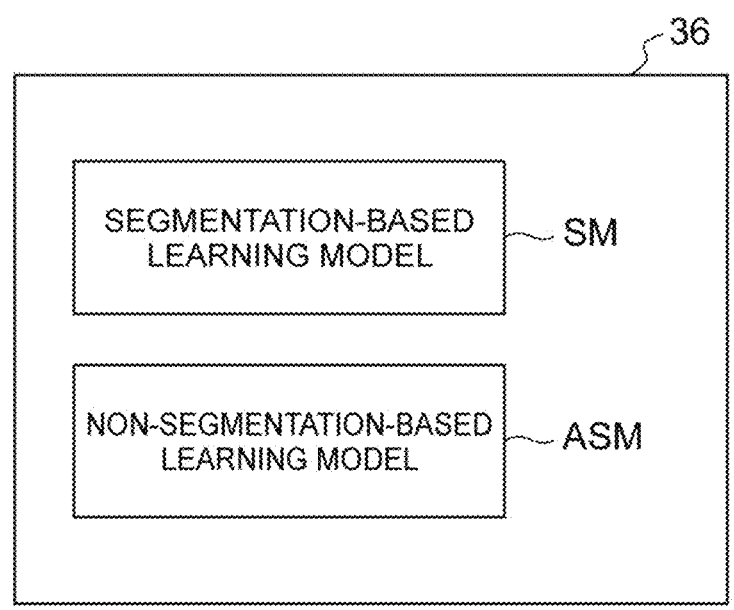

In the example illustrated in FIG. 4B, the learning model 36 may include a non-segmentation-based learning model ASM that mainly performs a process other than segmentation, that is, performs a non-segmentation-based process, in addition to a segmentation-based learning model SM that mainly performs segmentation, that is, performs a segmentation-based process.

The first to third learning models LM1 to LM3 are examples of the segmentation-based learning model SM. An example of the non-segmentation-based learning model ASM will be described later.

Examples of the first to third training data will be described below with reference to FIGS. 5A to 8C.

In the first training data illustrated in FIGS. 5A and 5B, images illustrated in FIGS. 5A and 5B are associated with each other. FIG. 5A illustrates an image including a constituent maxillofacial region (specifically a tooth region and a surrounding region thereof) when seen from a substantially vertical direction. FIG. 5B is an image in which a region of interest (specifically a tooth region) in the image illustrated in FIG. 5A is segmented and masked. An image other than the masked part is removed. In this example, the removed part is expressed as data corresponding to black (such as a predetermined CT value).

Figure 6A:
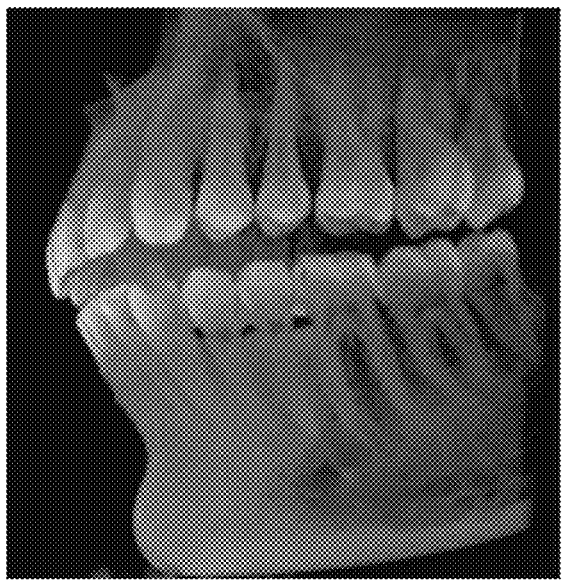
FIGS. 6A and 6B are diagrams illustrating an example of training data.
Figure 6B:
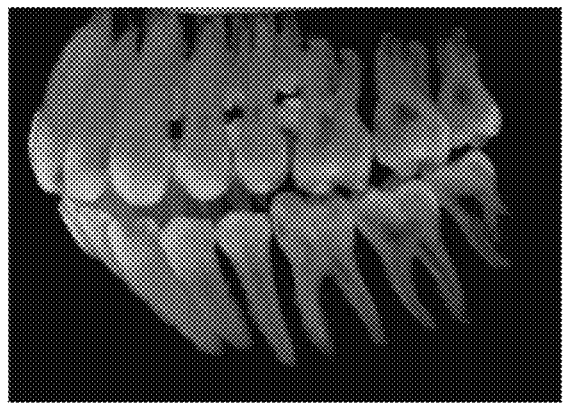

In the first training data illustrated in FIGS. 6A and 6B, images illustrated in FIGS. 6A and 6B are associated with each other. FIG. 6A illustrates projection data of a tooth region and a surrounding region thereof. FIG. 6B illustrates projection data which is acquired by extracting data of the tooth region from the projection data illustrated in FIG. 6A. In the projection data, data other than the tooth region is removed.

Figure 7A:
FIGS. 7A to 7C are diagrams illustrating an example of training data.
Figure 7B:
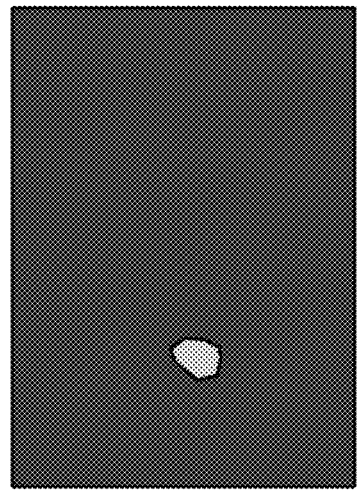

In the second training data illustrated in FIGS. 7A and 7B, images illustrated in FIGS. 7A and 7B are associated with each other. FIG. 7A illustrates a cross-section image of a constituent maxillofacial region (specifically, a mandibular region including a cross-section of one tooth in the tooth region). FIG. 7B illustrates an image in which a biologically important region (specifically, the mandibular canal) in the cross-section image illustrated in FIG. 7A is segmented and masked. An image other than the masked part is removed. In this example, the removed part is expressed as data corresponding to black (such as a predetermined CT value).

Although not illustrated, in the second training data, at least one of a panoramic tomographic image along the curve of the dental arch and a cross-section image crossing the curve and segmentation data of a biologically important region may be associated with each other as described above.

Training using the second training data may be performed using two-dimensional image data or may be performed using three-dimensional image data. Various known algorithms may be used for conversion between two-dimensional image data and three-dimensional image data. The same is true of other training data and training.

Figure 7C:

In the third training data, the images illustrated in FIGS. 7A and 7C are associated with each other. The sectional image illustrated in FIG. 7C indicates an example in which the biologically important region (specifically, the mandibular canal) in the image illustrated in FIG. 7A is segmented and marked.

Figure 8A:
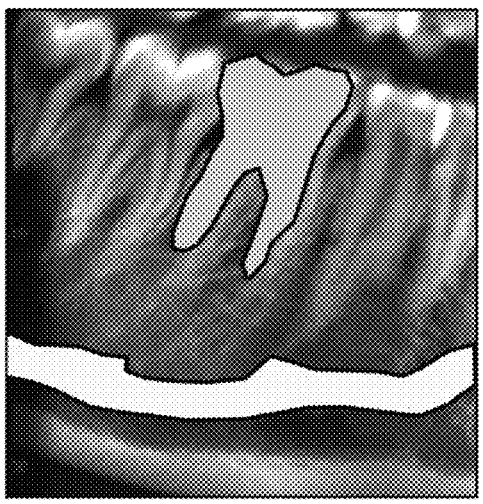
FIGS. 8A to 8C are diagrams illustrating an example of training data.
Figure 8B:
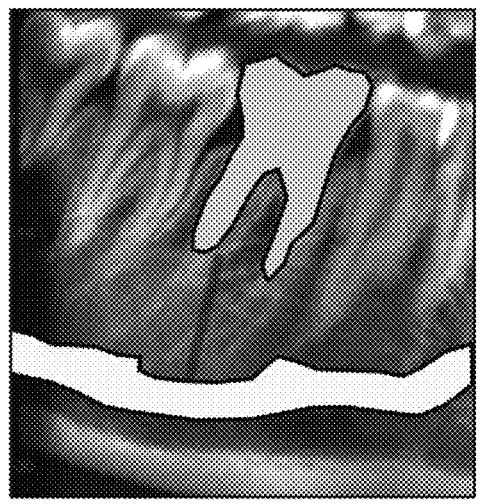
Figure 8C:

In the third training data illustrated in FIGS. 8A to 8C, images illustrated in FIGS. 8A and 8B are associated with each other. FIG. 8A illustrates a sectional image of the constituent maxillofacial region (specifically, the mandibular region including a sectional image of the tooth region) when seen in the substantially horizontal direction. In the sectional image, a region of interest (specifically, one specific tooth) in the biologically normal region is segmented. In the illustrated example, only one tooth is segmented, but a plurality of teeth (for example, the whole region of the tooth region) may be segmented. In the sectional image illustrated in FIG. 8A, the biologically important region (specifically, the mandibular canal) is also segmented. The learning model LM3 calculates a shortest distance from the tooth to the mandibular canal on the basis of the coordinates of the segmentation data. The learning model LM3 can output the three-dimensional positional relationship between the tooth and the mandibular canal as a visualized image on the basis of information which is acquired from the calculation. FIG. 8B illustrates an image indicating a three-dimensional positional relationship between the tooth which is a region of interest in the sectional image and the mandibular canal which is a biologically important region in FIG. 8A. In FIG. 8B, a straight line connecting the tooth to the mandibular canal at the shortest distance is illustrated. This straight line connects a root apex of the tooth to the mandibular canal and indicates a position of the mandibular canal with respect to the root apex of the tooth. The image illustrated in FIG. 8B can be displayed as an image on the output unit 38. Calculating of the shortest distance from the tooth to the mandibular canal or the process of visualizing the three-dimensional positional relationship between the tooth and the mandibular canal based on the coordinates in the segmentation data may be performed by an element other than the learning model LM3 of the calculation unit 34.

The image illustrated in FIG. 8B is an image in which the tooth and the mandibular canal are segmented, but segmentation may not be displayed therein, only the straight line connecting the tooth to the mandibular canal at the shortest distance may be displayed in a normal sectional image as illustrated in FIG. 8C. The image illustrated in FIG. 8C is the same as the image illustrated in FIG. 2. In the image illustrated in FIG. 8C, highlighting is not illustrated.

Referring back to FIG. 3, the output unit 38 is a unit (output means) that outputs information based on the result of calculation in the calculation unit 34. The output unit 38 may be configured to have, for example, the function of the output interface. The output interface may include a display (for example, the display 188 in FIG. 1) that presents a segmentation result to the user U3 in the aspect described above with reference to FIG. 2.

Without being limited to the image illustrated in FIG. 8B, the images with a sectional plane illustrated in FIGS. 2, 8A, and 8C may be displayed on the display 188 which is an example of the output interface. The learning model LM3 may be trained such that the displayed sectional plane is a sectional plane in which the shortest distance is displayed (or coordinate information enabling such display is output to the calculation unit 34) as illustrated in FIG. 2 and FIGS. 8A to 8C. In this case, training is performed to acquire a tomographic plane from which a root canal can be observed. Training may be performed such that the set sectional plane is a tomographic plane of a panoramic sectional layer with which a doctor is conventionally familiar as illustrated in FIGS. 8A to 8C. Training may be performed such that the set sectional plane is a tomographic plane of a cross-section layer with which a doctor is conventionally familiar as illustrated in FIGS. 7A and 7C. Training may be performed such that the tomographic plane illustrated in FIGS. 7A and 7C is moved in a mesio-distal direction to acquire a tomographic plane of a sectional plane from which a root canal can be observed.

In addition to the mode illustrated in FIG. 2, information may be presented in various display modes. For example, a distance may be displayed in colors for each voxel. Only nearby minimal points may be displayed. In a specific example, the distance from each voxel to the mandibular canal may be displayed in colors for each voxel. For example, the distance may be displayed in gradation such that a distance of 10 mm is displayed in green, a distance of 5 mm is displayed in yellow, and a distance of 0 mm is displayed in red. Alternatively, a distance from each voxel on the surface of a tooth to the mandibular canal may be calculated using the result of segmentation of the tooth, only a voxel in which the distance is minimal may be marked, and a distance thereof may be displayed.

The display in red is a notification mode with a high degree of necessity for immediate risk avoidance. In general, as a traffic signal, a green or blue signal is a notification mode with a low degree of necessity for immediate risk avoidance and a red signal is a notification mode with a high degree of necessity for immediate risk avoidance. This display in red is an example in which a notification mode can be increased in a risk by colors. In this way, a configuration in which the notification mode is changed from a notification mode with a low degree of necessity for immediate risk avoidance to a notification mode with a high degree of necessity for immediate risk avoidance as the inter-element distance decreases is preferable. An example in which the degree of necessity for immediate risk avoidance is increased may include various examples such as changing an image which is displayed to an image with a high risk in optical notification, increasing light intensity in optical notification (which includes changing from zero light intensity to some light intensity), decreasing an interval at which light is emitted in optical notification (which includes changing from zero interval to some interval), increasing a volume in audio notification (which includes changing from zero volume to some volume), decreasing an interval at which sound is output in audio notification (which includes changing from zero interval to some interval), uttering words notifying of a risk in audio notification, and changing a music piece to a music piece with a high sense of crisis or a high sense of despair in audio notification of a music piece.

Figure 9:
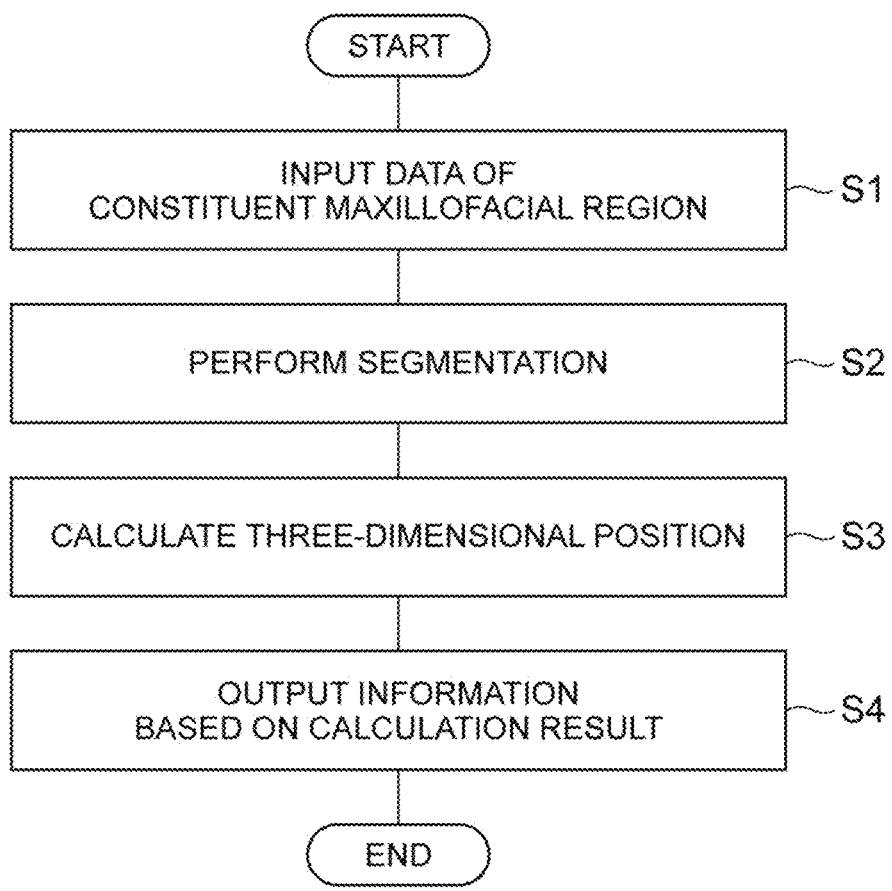
FIG. 9 is a flowchart illustrating an example of a process flow which is performed by the segmentation device.

FIG. 9 is a flowchart illustrating an example of a process flow which is performed by the segmentation device.

In Step S1, data of a constituent maxillofacial region acquired by the imaging device 2 is input to the input unit 32 of the segmentation device 3. For example, the image illustrated in FIG. 5A or 6A described above is input to the input unit 32.

In Step S2, the calculation unit 34 performs segmentation of a region of interest in a biologically normal region using the data of the constituent maxillofacial region input in Step S1 and the learning model 36 or the learning model 36A. For example, the calculation unit 34 acquires segmentation data of a tooth region by inputting the data of the constituent maxillofacial region input to the input unit 32 to the learning model 36 or the learning model 36A. The calculation unit 34 performs segmentation of a biologically important region using the data of the constituent maxillofacial region input to the input unit 32 and the learning model 36 or the learning model 36A. In order to perform segmentation of a biologically important region, a region of interest (for example, a tooth region) in the data of the constituent maxillofacial region input to the input unit 32 may be segmented.

A more specific example of the segmentation process will be described below with reference to FIG. 10. In this example, the learning model 36A is used. Step S2a in FIG. 10 may be performed as Step S2 in FIG. 9 when the learning model 36A includes the learning model LM1 and the learning model LM2. Here, the learning model LM2 is assumed to be a learning model which is generated such that segmentation data of a biologically important region is output when at least one of a panoramic tomographic image along a curve of a dental arch and a cross-section image crossing the curve is input.

In Step S2a1, the calculation unit 34 acquires segmentation data of a tooth region (a region of interest in the biologically normal region) by inputting the data of the constituent maxillofacial region input in Step S1 (see FIG. 9) described above to the learning model LM1. For example, the image illustrated in FIG. 5B or 6B is acquired.

Figure 11A:
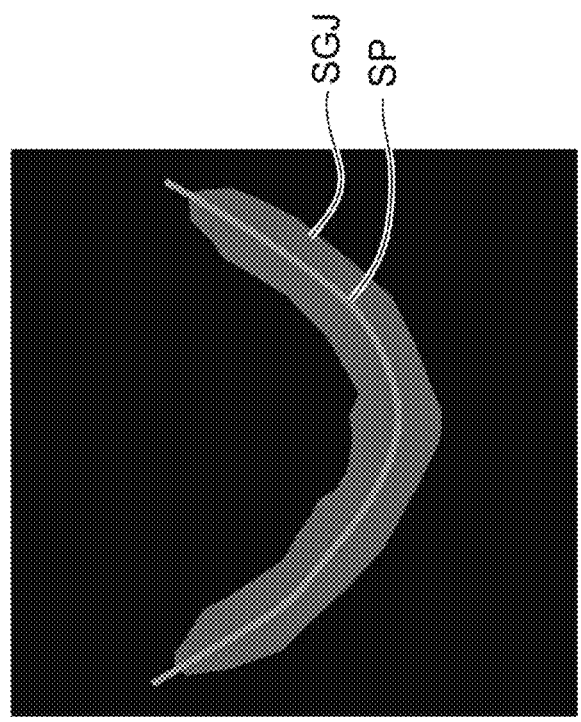
FIGS. 11A to 11D are diagrams illustrating an example in which a spline curve is set.

In Step S2a2, the calculation unit 34 sets a curved line along the curve of the dental arch for the segmentation data of the tooth region acquired in Step S2a1. The curved line along the curve of the dental arch is a curved line along a curve of an area with a substantially horse's hoof shape which is occupied by the dental arch. An example of the curved line is a spline curve. The calculation unit 34 sets a spline curve SP along the curve of the dental arch, for example, as illustrated in FIG. 11A. In the drawing, a segmentation region SG of a teeth part is also illustrated. Segmentation data of the tooth region corresponding thereto is reconfiguration data (that is, three-dimensional data). Accordingly, various methods are used to set the spline curve SP. For example, the spline curve SP may be set along the curve of the dental arch to pass through the centers in a buccolingual direction of upper and lower teeth. For example, as illustrated in FIG. 11A, the spline curve SP may be set to pass through the centers in the buccolingual direction of the teeth in a plane parallel to the occlusal surface when the mouth is shut. The spline curve SP may be set representatively using the lower teeth out of the upper and lower teeth. Since the mandibular canal which is located in the mandible is close to the lower teeth, use of the spline curve SP focused on the lower teeth is helpful. In this case, the spline curve SP may be set to pass through the centers of the lower teeth. The spline curve SP may be set along the root apexes. The training data may be automatically prepared and corrected. That is, training data may be generated or corrected by constructing an AI or the like to train a learning model. By manually correcting the spline curve SP which has been acquired as described above and inputting the corrected data to the input unit 32, it may be possible to achieve improvement in accuracy of training data and machine learning.

Figure 12B:
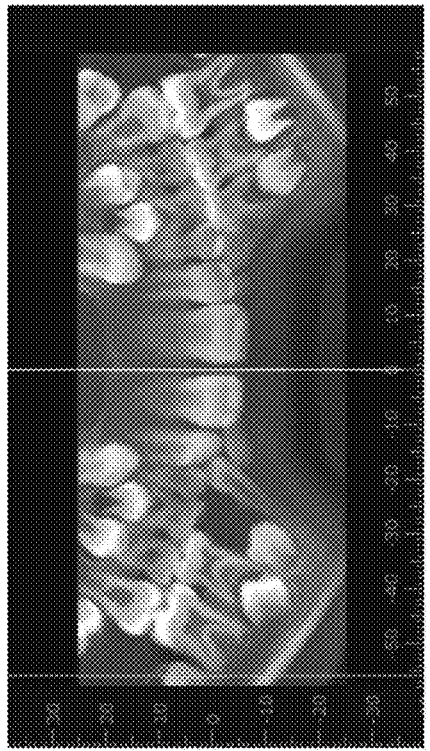
FIGS. 12A to 12E are diagrams illustrating an example of an image based on a spline curve.
Figure 12A:
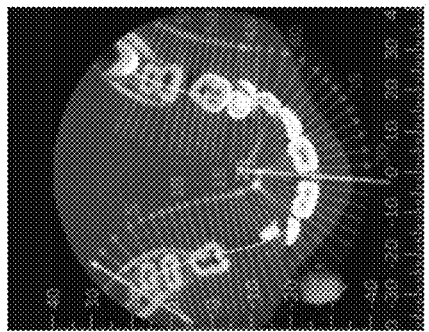
Figure 12E:
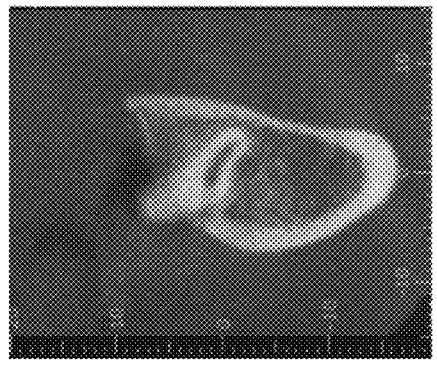
Figure 12D:
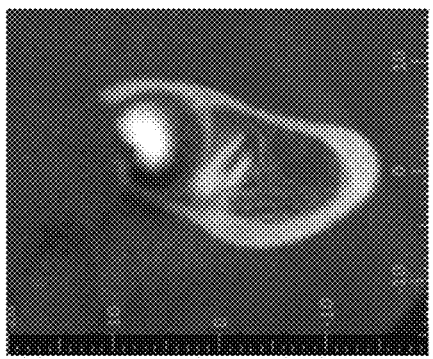
Figure 12C:
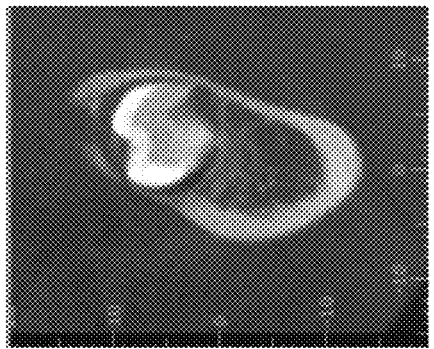

In Step S2a3, the calculation unit 34 generates at least one image of a panoramic tomographic image along the spline curve SP set in Step S2a2 and a cross-section image crossing the spline curve SP. The panoramic tomographic image is an example of an image of a tomographic plane along the curved line along the curve of the dental arch. The cross-section image is an example of an image of a tomographic plane crossing the curved line along the curve of the dental arch. An image of a tomographic plane along the curved line along the curve of the dental arch or an image of a tomographic plane crossing the curved line along the curve of the dental arch is an image of a tomographic plane in which a sectional plane of the curve of the dental arch is set. An example of the generated panoramic tomographic image will be described below with reference to FIGS. 12A and 12B. FIG. 12A illustrates an image in which the spline curve SP along the curve of the dental arch is set. FIG. 12B illustrates an example of a panoramic tomographic image (a panoramic image) along the spline curve SP in FIG. 12A. An example of the generated cross-section image will be described below with reference to FIGS. 12A, 12C, 12D and 12E. FIGS. 12C to 12E illustrate tomographic images perpendicular to the spline curve SP at different positions on the spline curve SP in FIG. 12A.

In Step S2a4, the calculation unit 34 acquires segmentation data of the biologically important region by inputting the panoramic tomographic image and/or the cross-section image generated in Step S2a3 to the learning model LM2.

Figure 10:
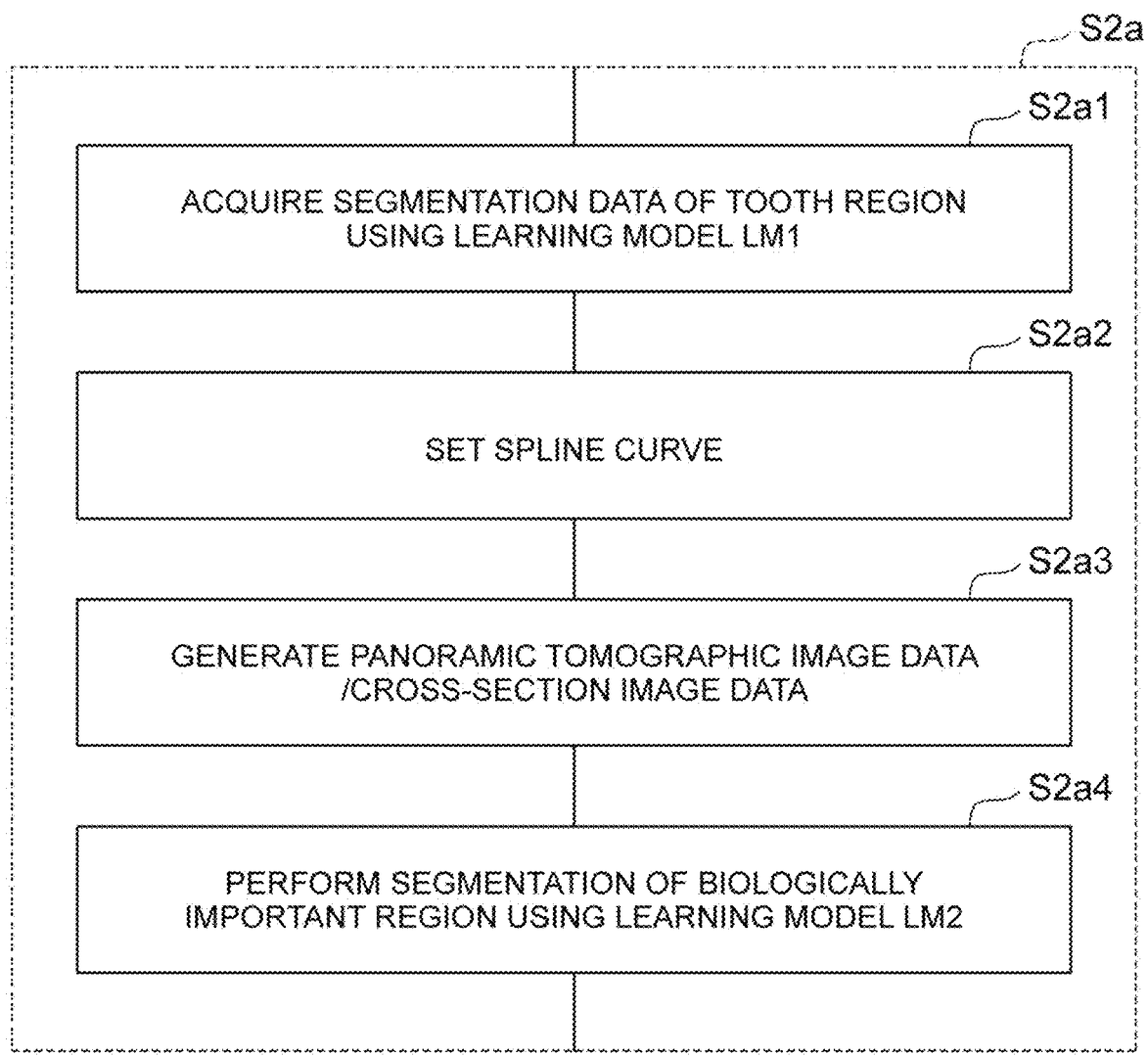
FIG. 10 is a flowchart illustrating an example of a process flow which is performed by the segmentation device.

In the example illustrated in FIG. 10, in Step S2a4, the image of the tomographic plane in which a sectional plane has been set for the curve of the dental arch and which is acquired through the processes of Steps S2a1 to S2a3 is input to the learning model LM2. Here, the learning model LM2 may be trained to directly determine a biologically important region in the constituent maxillofacial region from the data of the constituent maxillofacial region which has not been subjected to the processes and to acquire segmentation data thereof.

Referring back to FIG. 9, in Step S3, the calculation unit 34 calculates a three-dimensional position of the biologically important region in the constituent maxillofacial region on the basis of the result of segmentation in Step S2. Three-dimensional positional relationship information (such as the inter-element distance) between the biologically important region and the region of interest in the constituent maxillofacial region may be calculated.

The segmentation data of the biologically important region and the learning model LM3 of the learning model 36A may be used to calculate the three-dimensional position of the biologically important region. In this case, the calculation unit 34 acquires information of the three-dimensional position of the biologically important region in the constituent maxillofacial region by inputting the segmentation data of the biologically important region to the learning model LM3.

Segmentation data of a tooth region, the segmentation data of the biologically important region, and the learning model LM3 of the learning model 36A may be used to calculate the inter-element distance. In this case, the calculation unit 34 acquires the inter-element distance by inputting the segmentation data of the tooth region and the segmentation data of the biologically important region to the learning model LM3. The segmentation data of the tooth region may be acquired, for example, using the learning model LM1 in Step S2. The segmentation data of the biologically important region is acquired in Step S2.

In Step S4, the output unit 38 outputs information based on the result of calculation in Step S3. The outputting may include display of a visualized image. Examples of the output information include three-dimensional position information of the biologically important region or three-dimensional positional relationship information between the region of interest and the biologically important region. For example, data of the image illustrated in FIG. 7C is output as the three-dimensional position information of the biologically important region. FIG. 7C illustrates a cross-section image. In FIG. 7C, the position of the mandibular canal is marked. In this way, according to the cross-section image, the mandibular canal appears conspicuously. As an example of the three-dimensional positional relationship information between the region of interest and the biologically important region which is output in Step S4, the image described above with reference to FIG. 2 is presented. Since the straight line in FIG. 2 indicates the inter-element distance, information of the inter-element distance is presented. Another example is the image described above with reference to FIG. 8B or 8C.

The curved line along the curve of the dental arch may not be determined at the centers in the buccolingual direction of the upper and lower teeth along the curve of the dental arch. For example, the curved line may be a line along a curve of the dental arch region and may be determined on a buccal side (or in the vicinity of the buccal side) in a buccolingual region of the dental arch. Alternatively, the curved line may be determined on the lingual side (or in the vicinity of the lingual side) in the buccolingual region. Alternatively, the curved line may be determined in the vicinity of the buccal side (or the vicinity of the lingual side) which is slightly apart (for example, apart within 5 mm) from the dental arch region of the buccolingual region.

Figure 11D:
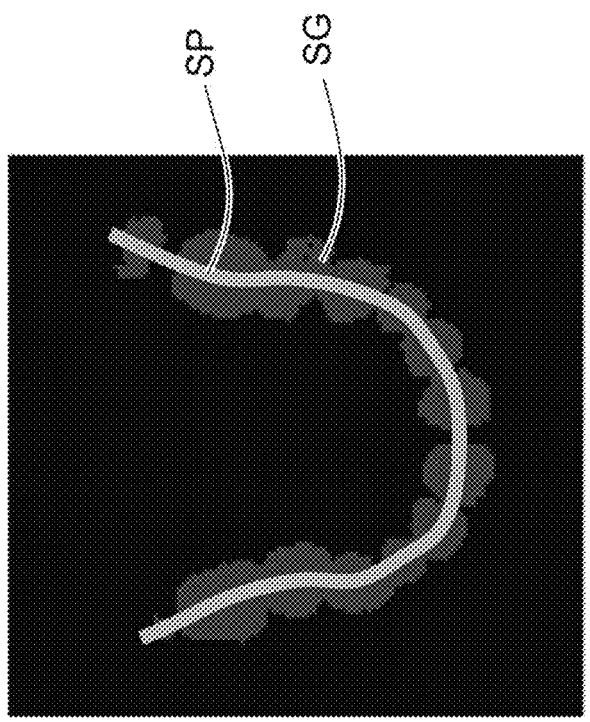
Figure 11B:
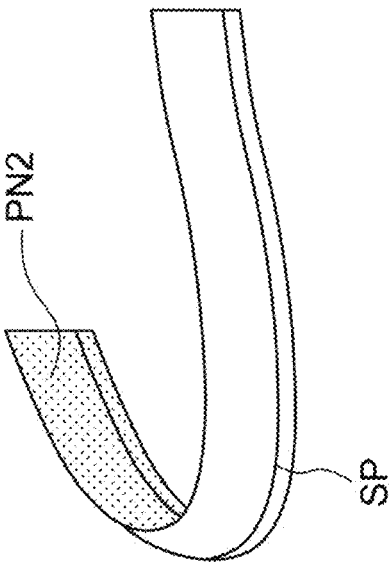
Figure 11C:
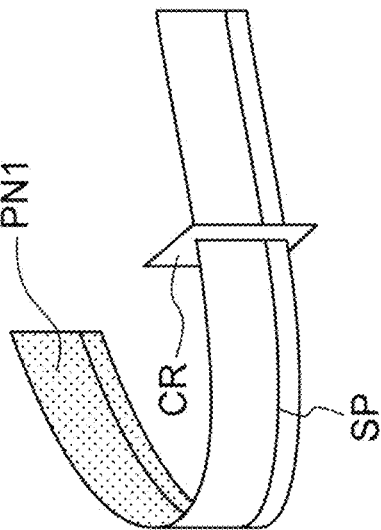

An example in which a panoramic sectional layer of the panoramic tomographic image and a cross-section of the cross-section image are set will be additionally described below with reference to FIGS. 11B and 11C.

The top side of the head is defined as an upper side and the neck side is defined as a lower side. It is assumed that one spline curve SP is determined on a plane which crosses the dental arch and which is perpendicular or substantially perpendicular to the body axis. As illustrated in FIG. 11B, an area which extends two-dimensionally to sufficiently include the tooth region in the upper and lower sides of the spline curve SP can be set as a panoramic sectional layer PN1. The panoramic sectional layer PN1 may be set to a known region which has been conventionally determined as a panoramic sectional layer. A cross-section CR may be set as a plane crossing the panoramic sectional layer PN1 as illustrated in FIG. 11B. The cross-section CR may perpendicularly cross the panoramic sectional layer PN1.

As illustrated in FIG. 6B, in an incisive tooth region of a standard alignment of teeth, a root apex is often inclined to the rear side of the head with respect to a dental crown (so-called prognathic). Accordingly, as illustrated in FIG. 11C, a prognathic panoramic sectional layer PN2 which is suitable for this shape may be set. By performing the process illustrated in FIG. 11A on a plurality of layers between a root apex and a dental crown, a plurality of spline curves in the vertical direction may be acquired. By performing a process of connecting the plurality of spline curves, the panoramic sectional layer illustrated in FIG. 11B or 11C may be set as a result. Modification and adjustment may be performed such that the panoramic sectional layer PN2 illustrated in FIG. 11C is acquired, for example, by temporarily setting the panoramic sectional layer PN1 illustrated in FIG. 11B and automatically or manually adjusting a place at which the panoramic sectional layer is clearly focused.

Some users U2 may have an edentulous jaw or have all teeth or many teeth lost. In order to cope with this case, segmentation of a jawbone region may be performed. For example, the jawbone region may be segmented as illustrated in FIG. 11D. FIG. 11D illustrates an example of segmentation data of a mandibular bone region. In the drawing, a region close to the root apex of the teeth alignment of the mandible is selected for the purpose of easy understanding, but a region close to the dental crown may be selected. That is, any appropriate range may be selected as long as a learning model can be coped with. A spline curve SP is set for the segmentation data SGJ of the jawbone region. The spline curve may be set to pass through the center in the buccolingual direction of the jawbone similarly to the spline curve set for the dental arch. For example, the spline curve may be set to pass through the center in the buccolingual direction on a plane parallel to the occlusal surface when the mouth is shut.

The above-mentioned segmentation device 3 can be specified, for example, as follows. The segmentation device 3 includes an input unit 32, a calculation unit 34, a learning model 36 or a learning model 36A, and an output unit 38. Data of a constituent maxillofacial region is input to the input unit 32 (Step S1). The calculation unit 34 performs segmentation of a biologically important region using the data of the constituent maxillofacial region input to the input unit 32 and the learning model 36 or the learning model 36A which was generated in advance (Step S2) and calculates a three-dimensional position of the biologically important region of the constituent maxillofacial region (Step S3). The output unit 38 outputs information based on a result of calculation from the calculation unit 34 (Step S4). The learning model 36 or the learning model 36A is a learning model which is generated using training data such that segmentation data of the biologically important region is output when image data (the data of the constituent maxillofacial region) which is acquired by an X-ray CT scan or an MRI scan of the constituent maxillofacial region such as at least one of projection data and reconfiguration data acquired by an X-ray CT scanner or an MRI scanner, or data derived therefrom is input.

With this segmentation device 3, segmentation of a biologically important region is performed using a constituent maxillofacial region and the learning model 36 or the learning model 36A which was generated in advance. The learning model 36 or the learning model 36A is a learning model which is generated using training data such that segmentation data of the biologically important region is output when the data of the constituent maxillofacial region is input. Accordingly, it is possible to segment a biologically important region from image data acquired by the imaging device 2. By performing segmentation using the learning model 36 or the learning model 36A in this way, a likelihood of improvement in segmentation accuracy increases, for example, in comparison with a case in which segmentation is mathematically performed on the basis of a CT value, a concentration value, or the like. With improvement in accuracy, a likelihood of a person's intervention not being required also increases.

The learning model 36 or the learning model 36A may be a learning model which is generated using the training data such that segmentation data of a region of interest in a biologically normal region which is a region outside of the biologically important region in the constituent maxillofacial region is additionally output when the data of the constituent maxillofacial region is input. The calculation unit 34 may perform segmentation of the region of interest (Step S2). Accordingly, it is possible to segment the region of interest from the constituent maxillofacial region.

The calculation unit 34 may calculate (output or generate) three-dimensional positional relationship information between the biologically important region and the region of interest (Step S3). Accordingly, it is possible to understand a three-dimensional positional relationship between the biologically important region and the region of interest.

The region of interest may be at least one region of a tooth region, a region which is occupied by an artifact implanted in the tooth region, a boundary region between a jawbone and the tooth region, a boundary region between the jawbone and the artifact, and an alveolar region. The learning model 36 or the learning model 36A may be generated using the training data such that segmentation data of each region of interest is output when the data of the constituent maxillofacial region is input. Accordingly, it is possible to segment each region of interest from the constituent maxillofacial region.

The learning model 36A may include a learning model LM1 and a learning model LM2. The learning model LM1 is a first learning model which is generated using first training data such that segmentation data of a tooth region is output when the data of the constituent maxillofacial region is input. The learning model LM2 is a second learning model which is generated using second training data such that segmentation data of the biologically important region is output when the data of the constituent maxillofacial region and the segmentation data of the tooth region are input. The calculation unit 34 may acquire the segmentation data of the tooth region using the data of the constituent maxillofacial region input to the input unit 32 and the learning model LM1 (Step S2a1) and perform segmentation of the biologically important region using the acquired segmentation data of the tooth region, the data of the constituent maxillofacial region input to the input unit 32, and the learning model LM2 (Steps S2a2 to S2a4). By using the learning model LM1 and the learning model LM2 in combination in this order, the likelihood of improvement in segmentation accuracy increases further in comparison with a case in which the learning models are independently used. Particularly, since segmentation is performed with a focus on the tooth region, it is possible to further improve segmentation accuracy more than when segmentation is performed along with other regions.

The learning model LM2 may be a learning model which is generated using the second training data such that segmentation data of the biologically important region is output when at least one of a panoramic tomographic image along a curve of a dental arch and a cross-section image crossing the curve is input. The calculation unit 34 may set a spline curve for the segmentation data of the tooth region acquired using the learning model LM1 (Step S2a2), generate at least one of a panoramic tomographic image along the set spline curve and a cross-section image crossing the set spline curve (Step S2a3), and perform segmentation of the biologically important region using the generated image and the learning model LM2 (Step S2a4). Accordingly, it is possible to segment a biologically important region in a panoramic tomographic image, a cross-section image, or the like. A biologically important region (blood vessels, neural tubes, a mandibular canal, a biological tissue passing through the mandibular canal) is visibly presented on an image such as a tomographic image and a cross-section image (see FIGS. 12B to 12E).

The calculation unit 34 may calculate a distance between the region of interest and the biologically important region as an inter-element distance (Step S3). Accordingly, it is possible to calculate a specific distance between a region of interest and a biologically important region.

The output unit 38 may display information of the inter-element distance calculated by the calculation unit 34 (Step S4). Accordingly, it is possible to acquire information of an inter-element distance.

The learning model 36A may include a learning model LM3. The learning model LM3 is a third learning model which is generated using third training data such that the inter-element distance is output when the segmentation data of the tooth region and the segmentation data of the biologically important region are input. The calculation unit 34 may calculate the inter-element distance using the segmentation data of the tooth region, the segmentation data of the biologically important region, and the learning model LM3 (Step S3). By calculating the inter-element distance using the third learning model in this way, it is possible to increase a likelihood of improvement in calculation accuracy of the inter-element distance.

Figure 13:
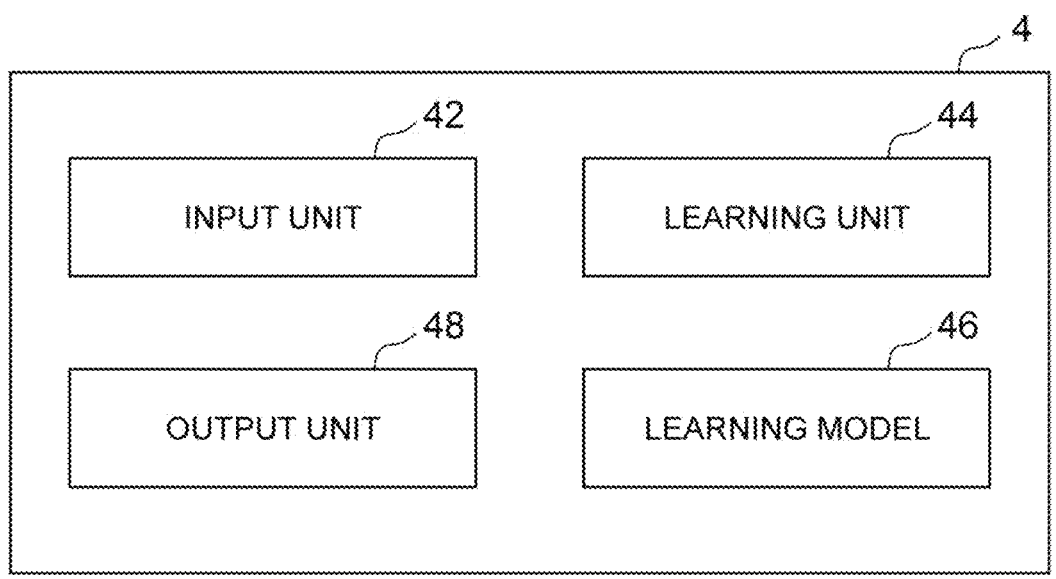
FIG. 13 is a diagram illustrating an example of functional blocks of a learning device.

Generation of a learning model can be performed, for example, using a learning device. The learning device may be a computer device including a processor (such as a CPU) and a memory (such as a ROM and a RAM). In the example illustrated in FIG. 13, a learning device 4 includes an input unit 42, a learning unit 44, a learning model 46, and an output unit 48 as functional blocks. The learning unit 44 performs training of the learning model 46 using training data which is input to the input unit 42. The learning model 46 is output from the output unit 48.

For example, the first training data is input to the input unit 42. The learning unit 44 performs training of the learning model 46 using the first training data input to the input unit 42. The learning model 46 is output (taken out) from the output unit 48. The output learning model 46 may be implemented as the learning model 36 or the learning model 36A (more specifically, the learning model LM1) in the segmentation device 3. The same is true of the second training data and the third training data and the learning model LM2 and the learning model LM3.

The learning model 36 (see FIGS. 3 and 4B) or the learning model 36A (see FIG. 4A) may be provided outside of the segmentation device 3. For example, when the learning model 36 or the learning model 36A is provided in an external server (not illustrated), the segmentation device 3 may be configured to communicate with the external server. The calculation unit 34 of the segmentation device 3 may use the learning model 36 or the learning model 36A in the external server by communication.

Figure 14:
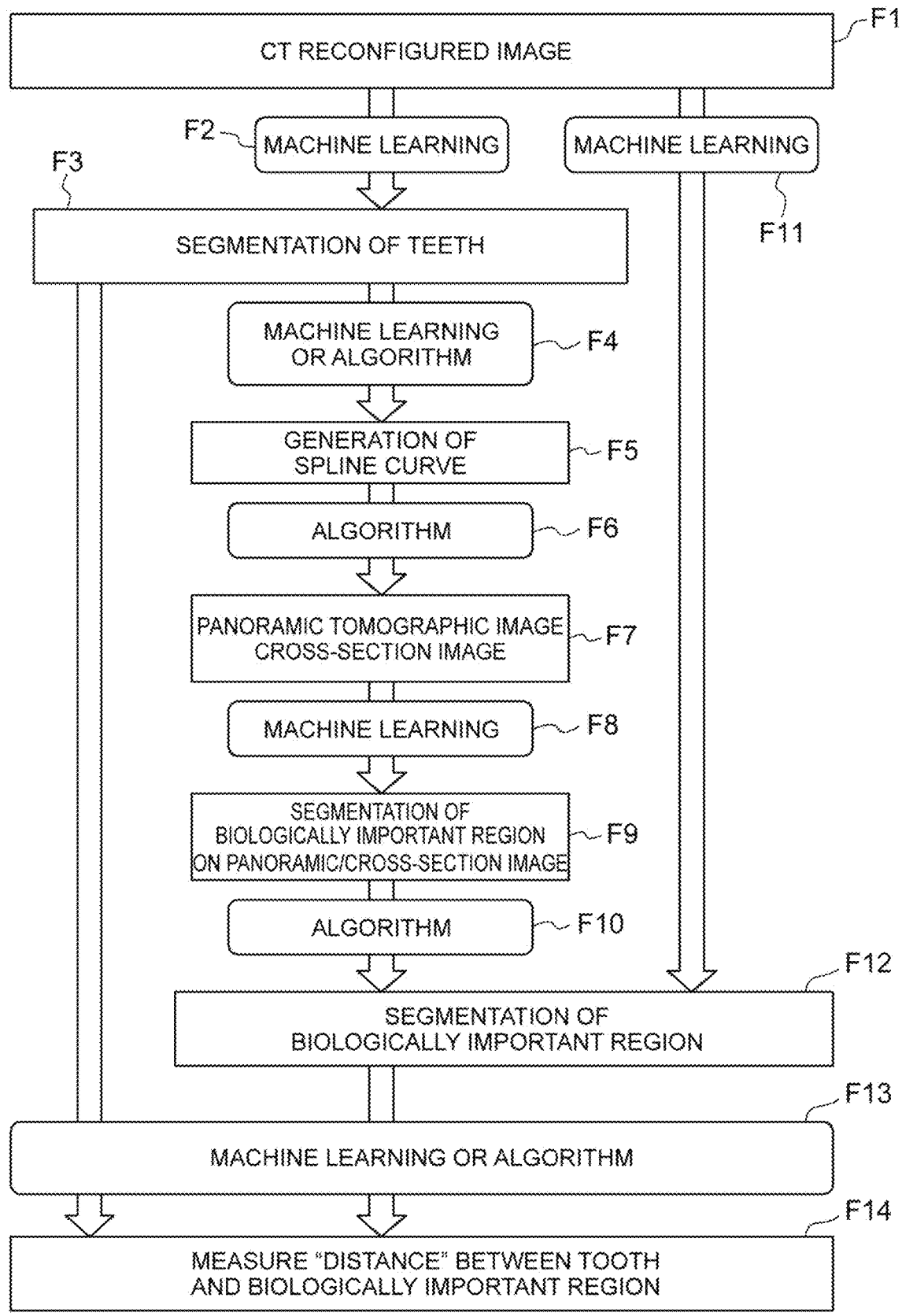
FIG. 14 is an inference flow illustrating an example of a whole image.

While some embodiments of the present disclosure have been described above, the present disclosure is not limited to the embodiments. For example, some processes using a learning model may be replaced with processes using an algorithm. Here, the algorithm refers to an algorithm not using a learning model. Various known algorithms depending on usage may be used as the algorithm. On the other hand, some processes using an algorithm may be replaced with processes using a learning model. An example of the whole image including various variations will be described below with reference to FIG. 14. In FIG. 14, a learning model which has been generated using machine learning as described above and learning which has been performed to generate the learning model is referred to and illustrated as "machine learning." That is, "machine learning" in FIG. 14 is used in a concept including both a learning model and a learning operation.

In the example of an inference flow illustrated in FIG. 14, a flow F1 represents acquisition of a CT reconfigured (reconstructed) image. For example, the CT reconfigured image which is generated using projection data acquired by the imaging device 2 described above is input to the input unit 32 of the segmentation device 3.

A flow F2 represents machine learning using the CT reconfigured image acquired in the flow F1. The machine learning is configured to perform segmentation of teeth. For example, at least the first training data described above may be used for the machine learning.

A flow F3 represents segmentation of teeth using the machine learning in the flow F2. For example, the image illustrated in FIGS. 6A and 6B is acquired by the segmentation of teeth.

A flow F4 represents machine learning or an algorithm using the segmentation data of teeth acquired in the flow F3. The machine learning or algorithm is configured to generate a spline curve. For example, at least the third training data described above may be used for the machine learning. Various known algorithms may be used for the algorithm.

A flow F5 represents generation of a spline curve using the machine learning or algorithm in the flow F4. For example, the spline curve illustrated in FIGS. 11A to 11D is generated.

A flow F6 represents an algorithm using the spline curve generated in the flow F5. The algorithm is configured to generate a panoramic tomographic image or a cross-section image. Various known algorithms may be used for the algorithm.

A flow F7 represents generation of a panoramic tomographic image or a cross-section image using the algorithm in the flow F6. For example, the panoramic tomographic image illustrated in FIG. 12B or the cross-section image illustrated in FIGS. 12C to 12E is generated.

A flow F8 represents machine learning using the panoramic tomographic image or the cross-section image generated in the flow F7. The machine learning is configured to perform segmentation of a biologically important region such as a mandibular canal, blood vessels, or neural tubes in the panoramic tomographic image or the cross-section image. For example, at least the second training data described above may be used for the machine learning.

A flow F9 represents segmentation of a biologically important region using the machine learning in the flow F8. For example, the image illustrated in FIG. 2 or FIG. 7B is generated.

A flow F10 represents an algorithm using the result of segmentation of the biologically important region in the flow F9. The algorithm is configured to convert data of a panoramic image or a cross-section image including the segmented biologically important region to segmentation data in volume. Various known algorithms may be used for the algorithm.

A flow F11 represents machine learning using the CT reconfigured image in the flow F1. The machine learning is configured to perform segmentation of a biologically important region. For example, at least the second training data described above may be used for the machine learning.

A flow F12 represents segmentation of a biologically important region using the algorithm in the flow F10 or the machine learning in the flow F11. For example, data of the image illustrated in FIG. 2 or FIG. 7B is generated.

A flow F13 represents machine learning or an algorithm using the result of segmentation of teeth in the flow F3 or the result of segmentation of a biologically important region in the flow F12. The machine learning or algorithm is configured to measure (calculate) a distance between a tooth and the biologically important region. For example, at least the third training data described above may be used for the machine learning. Various known algorithms may be used for the algorithm.

A flow F14 represents measurement of a distance between a tooth and a biologically important region using the machine learning or algorithm in the flow F13. For example, a length of a straight line connecting the tooth to the mandibular canal at a shortest distance as illustrated in FIG. 2 is measured.

An application example of the segmentation device 3 will be described below. An application example to extraction of a tooth will be first described and an application example of an implant treatment will be then described.

The segmentation device 3 may be a device that is provided for supporting extraction of a tooth (a tooth extraction support device). This is because the above-mentioned three-dimensional positional relationship information (such as the inter-element distance) between a biologically important region and a biologically normal region can be used as a matter for determination of extraction of a tooth. The segmentation device 3 serving as the tooth extraction support device is configured to perform the following processes in addition to the above-mentioned segmentation.

The segmentation device 3 receives designation of a tooth which is to be extracted by a user U3. For example, the output unit 38 presents an image of a tooth region (for example, see FIG. 5A or 6B). The input unit 32 receives an operation for designating a specific tooth in the tooth region from the user U3.

The segmentation device 3 calculates coordinates of the designated tooth (a target tooth) and coordinates of the mandibular canal which is located in the vicinity thereof. Then, the segmentation device 3 calculates a shortest distance between the target tooth and the mandibular canal as an inter-element distance on the basis of the calculated coordinates. This process is performed by the calculation unit 34.

The calculation unit 34 calculates a difficulty level of tooth extraction based on the inter-element distance. The difficulty level of tooth extraction decreases as the inter-element distance increases, and the difficulty level of tooth extraction increases as the inter-element distance decreases. Determination with a threshold value may be used for determination of the inter-element distance. In this case, the calculated inter-element distance is compared with a preset threshold value. The threshold value is a value for determining whether the target tooth is located in a region close to the mandibular canal (a threshold value for a caution region for approaching the mandibular canal). This process is performed by the calculation unit 34.

The segmentation device 3 presents the result of determination using the threshold value. For example, a numerical value and/or an image indicating the calculated difficulty level of tooth extraction is displayed. A heat map may be displayed in the image. The heat map may be displayed in a mode based on the difficulty level. Through display of the heat map, for example, it is possible to issue an alarm indicating that the difficulty level is high. This display is performed by the output unit 38.

An example of the tooth extraction is extraction of a wisdom tooth or a molar tooth. A mandibular canal through which an inferior alveolar nerve, an inferior alveolar artery, or the like passes may pass through the vicinity of a root of a wisdom tooth or a molar teeth. In some cases, a wisdom tooth or a molar teeth may be located very close to the mandibular canal or may intrude into the mandibular canal, or severe disability such as paralysis may be left when it is damaged. According to the above-mentioned technique, since the difficulty level of tooth extraction is known before the treatment (operation), it is possible to decrease a risk for damage of the mandibular canal in extraction of a tooth. This will be described below with reference to FIGS. 15A to 17B.

Figure 15A:
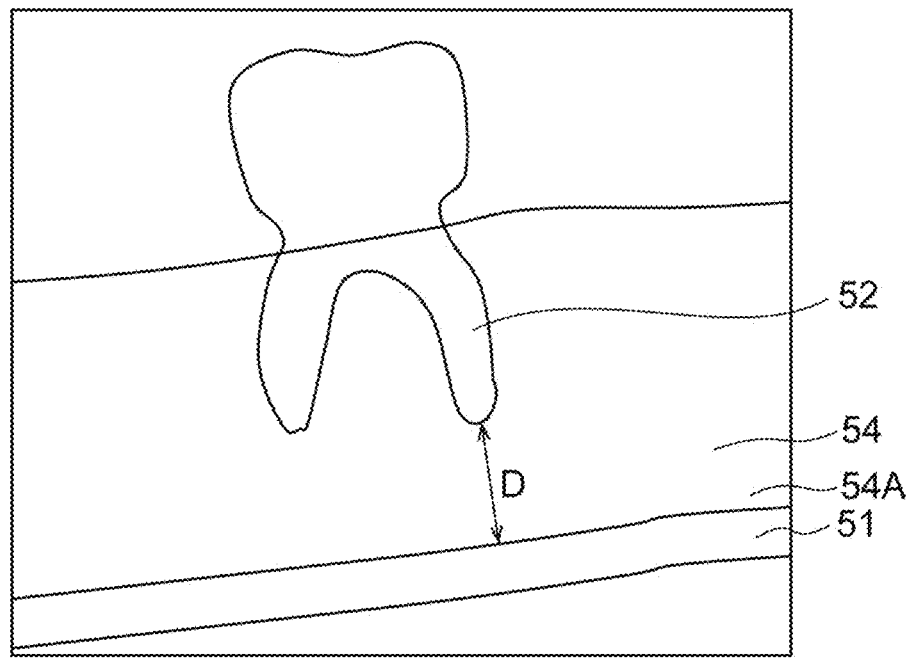
FIGS. 15A and 15B are diagrams illustrating applications to extraction of a tooth.
Figure 15B:
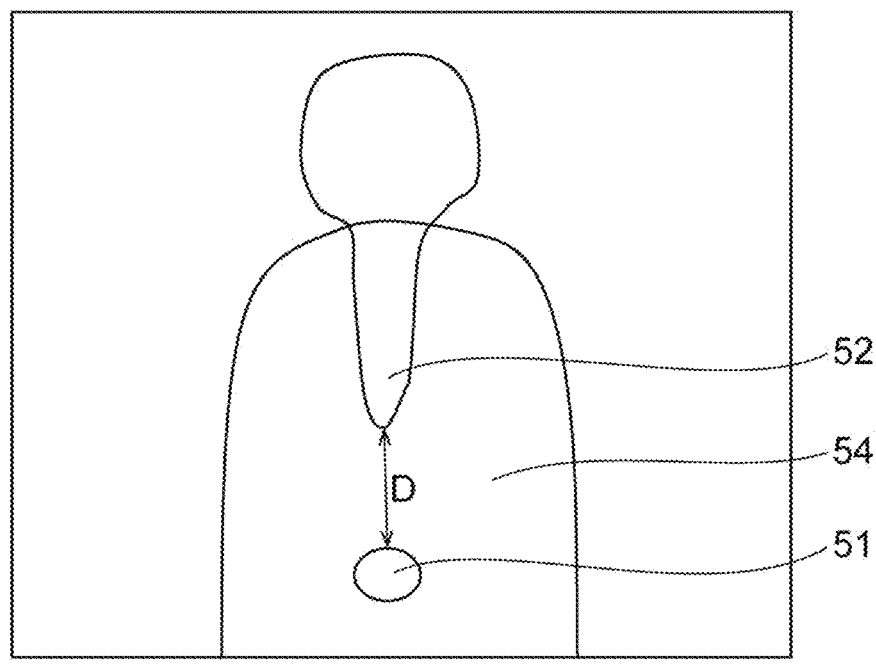

In FIGS. 15A and 15B, a mandibular canal 51 and a tooth 52 are illustrated as a biologically important region and a region of interest, respectively. FIG. 15A illustrates an image when seen from a direction crossing a dental arch. FIG. 15B illustrates an image when seen from a direction along a dental arch. The same is true of FIGS. 16A to 20B which will be described later. In FIGS. 15A and 15B, an inter-element distance D is a distance between the mandibular canal 51 and the tooth 52. In this example, three-dimensional positional relationship between the tooth 52 in a biologically normal region 54 and the mandibular canal 51 located inside the biologically normal region 54 is indicated, and three-dimensional positional relationship between the tooth 52 and the mandibular canal 51 at a region of non-interest 54A is also indicated. In this example, a root portion of the tooth 52 is located closest to the mandibular canal 51, and a distance therefrom to the mandibular canal 51 is the inter-element distance D.

Figure 16A:
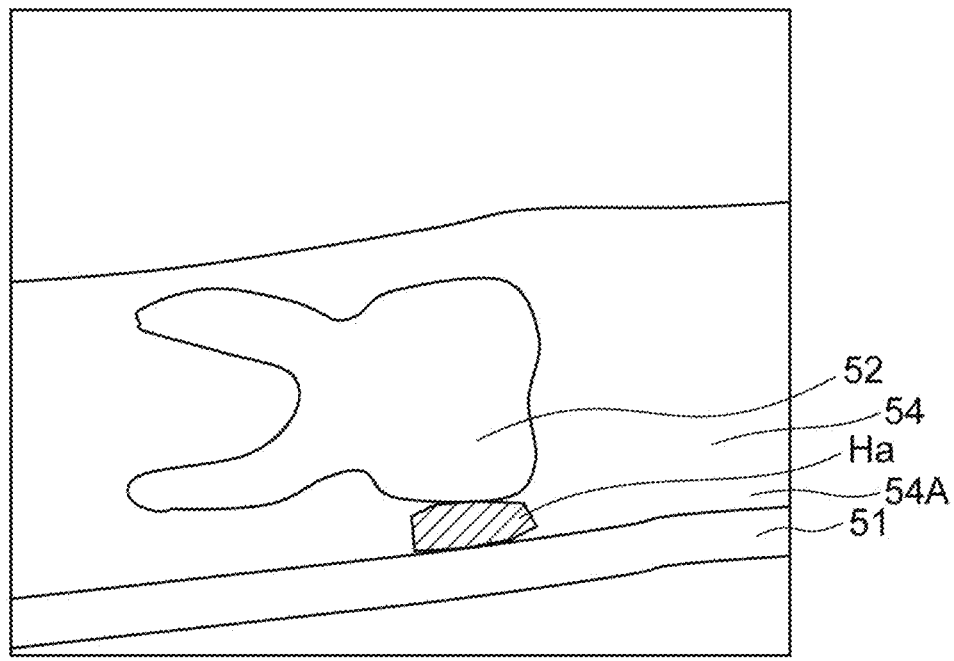
FIGS. 16A and 16B are diagrams illustrating applications to extraction of a tooth.
Figure 16B:
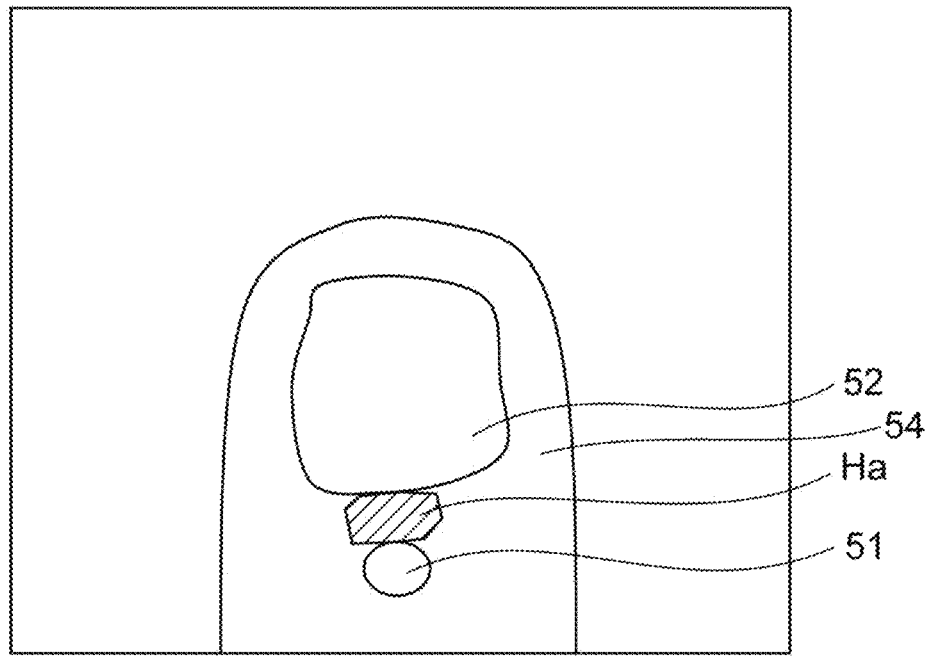

In the example illustrated in FIGS. 16A and 16B, the tooth 52 is a horizontally impacted wisdom tooth, a side portion of the tooth is located closest to the mandibular canal 51, and a distance therefrom to the mandibular canal 51 is the inter-element distance. In this example, the inter-element distance is shorter in comparison with that in the example illustrated FIGS. 15A and 15B. A region Ha between the mandibular canal 51 and the tooth 52 is displayed in a heat map.

Figure 17A:
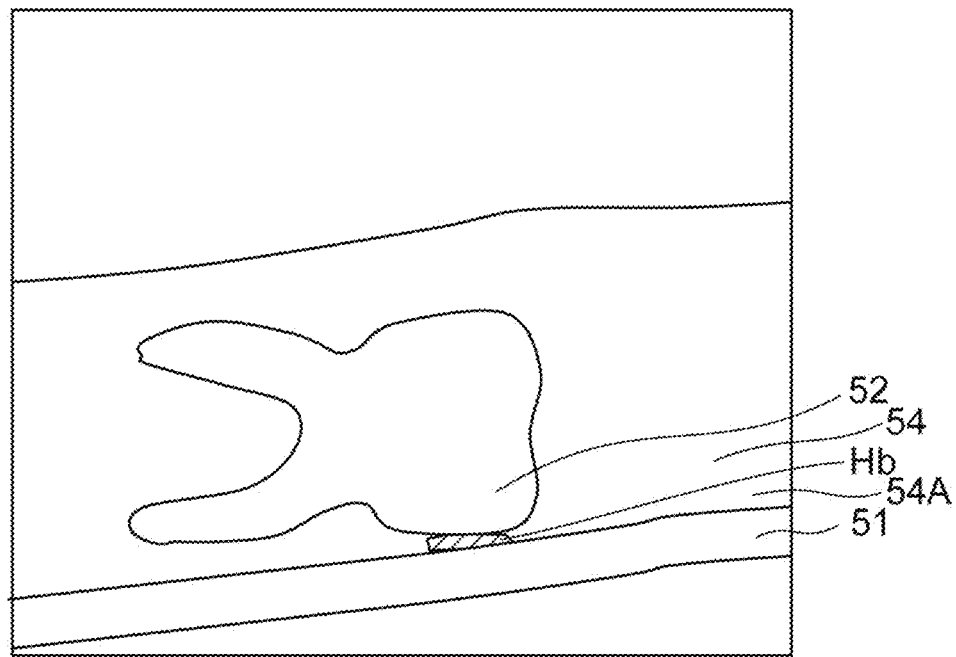
FIGS. 17A and 17B are diagrams illustrating applications to extraction of a tooth.
Figure 17B:
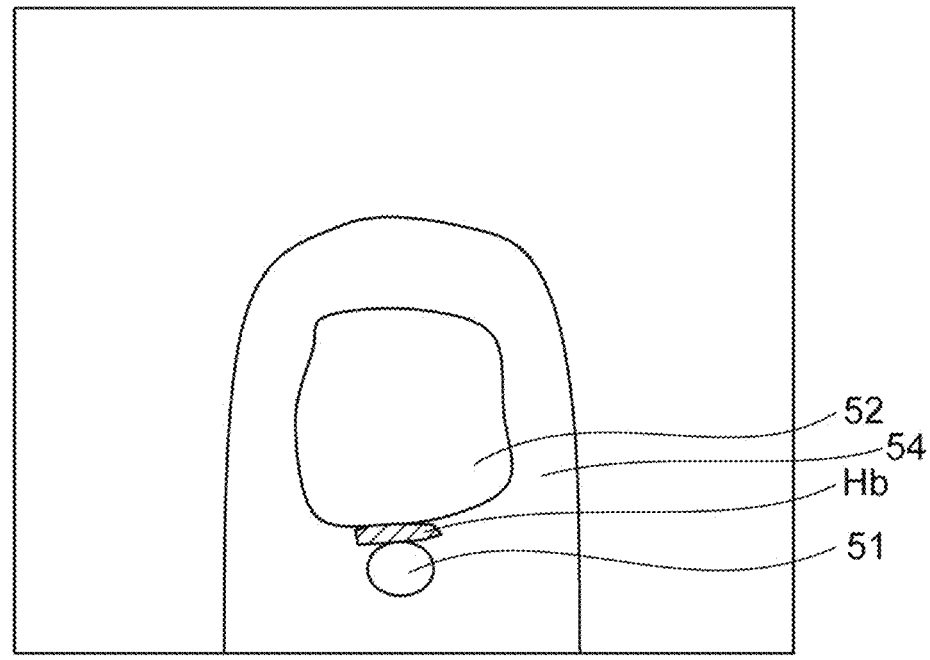

In the example illustrated in FIGS. 17A and 17B, similarly, the tooth 52 is a horizontally impacted wisdom tooth. In this example, the inter-element distance is shorter in comparison with that in the example illustrated FIGS. 16A and 16B. A region Hb between the mandibular canal 51 and the tooth 52 is displayed in a heat map. The heat map indicating the region Hb may be emphasized more (for example, displayed in darker red) than the heat map indicating the region Ha (see FIGS. 16A and 16B).

The segmentation device 3 may be a device that is provided for supporting an implant treatment (an implant treatment support device). This is because the above-mentioned three-dimensional positional relationship information between a biologically important region and a biologically normal region (such as the inter-element distance) can serve as a matter for determination of an implant treatment. The segmentation device 3 serving as the implant treatment support device is configured to perform the following process in addition to the above-mentioned segmentation.

The segmentation device 3 receives designation of a treatment target position from a user U3. For example, the output unit 38 presents an image of a constituent maxillofacial region of a user U2. The input unit 32 receives an operation for designating a specific position in an image as the treatment target position from the user U3 (a user operation).

The segmentation device 3 presents an indicator of the treatment target position for the image of the constituent maxillofacial region on the basis of the designated treatment target position. The indicator may be an indicator indicating an implant. This process is performed by the output unit 38.

The segmentation device 3 receives an operation for moving the presented indicator (a movement operation). For example, the input unit 32 receives the movement operation from the user U3 and the output unit 38 presents the indicator to move on the basis of the movement operation.

The segmentation device 3 calculates a positional relationship between the biologically important region and the indicator of the treatment target position. An example of the positional relationship is an inter-element distance. This process is performed by the calculation unit 34.

The segmentation device 3 receives selection of a virtual implant from the user U3. For example, the output unit 38 presents a plurality of implant candidates. The input unit 32 receives an operation for selecting a specific implant out of the plurality of implant candidates from the user U3.

The segmentation device 3 simulates insertion and arrangement of the selected virtual implant at an implant supposed position. This process is performed by the calculation unit 34. The simulation may be performed using reconfiguration data, stereolithography (STL) data, or the like.

The segmentation device 3 calculates coordinates of the virtual implant of which insertion and arrangement have been simulated and coordinates of the mandibular canal which is located in the vicinity thereof. Then, the segmentation device 3 calculates a shortest distance between the virtual implant and the mandibular canal as the inter-element distance on the basis of the calculated coordinates. This process is performed by the calculation unit 34.

The calculation unit 34 calculates a difficulty level of an implant treatment based on the inter-element distance. The difficulty level of an implant treatment decreases as the inter-element distance increases, and the difficulty level of an implant treatment increases as the inter-element distance decreases. Determination with a threshold value may be used for determination of the inter-element distance. The threshold value may be determined and input by the user U3 at the time of inputting, or an optimal threshold value may be extracted on the basis of opinion of one or more clinical specialized doctors, or an optimal threshold value may be determined by machine learning based on big data such as Internet information. The threshold value may be determined, for example, to be α mm, and the value of α may be considered as being various values. Examples of the value of α can be determined to be a form of 5, 4, 3, 2, and 1, a form of 5 to 4, 4 to 3, 3 to 2, 2 to 1, 1 or less, or a form including a decimal point. In this case, the calculated inter-element distance is compared with a preset threshold value. The threshold value is a value for determining whether a virtual implant is located in a region close to the mandibular canal (a threshold value for a caution region for approaching the mandibular canal) when the virtual implant is implanted. When the virtual implant overlaps the mandibular canal, the inter-element distance may have a minus value, and determination with a threshold value can be performed on such a value. For example, when the position of an implant is close to the mandibular canal or overlaps the mandibular canal at the time of implanting, it may be determined that the difficulty level of an implant treatment is high. This process is performed by the calculation unit 34.

The segmentation device 3 may display a synthetic image of an image of a biologically normal region and an image of segmentation data of a biologically important region. The image of the biologically normal region is generated by the calculation unit 34. The synthetic image is presented by the output unit 38. The segmentation device 3 may receive an input of a volume including only an implant and a volume including only the mandibular canal, calculate a distance therebetween, and output the difficulty level of the treatment.

The segmentation device 3 presents a result of determination using the threshold value. For example, a numerical value and/or an image indicating the calculated difficulty level of an implant treatment is displayed. A heat map may be presented in the image. The heat map may be presented in a mode based on the difficulty level. By presenting the heat map, for example, it is possible to issue an alarm indicating that the difficulty level is high. This presentation is performed by the output unit 38.

The segmentation device 3 may present information of a usable implant. For example, information of an implant which is usable based on the result of calculation of the difficulty level of an implant treatment from the calculation unit 34 is presented by the output unit 38.

An example of an implant treatment is implanting the implant into a mandibular molar part (a jawbone molar part). The implant is implanted into a lost (or extracted) mandibular molar part. The treatment needs to be performed in sufficient consideration of a distance from the implant to the mandibular canal after being implanted. With the above-mentioned technique, since the difficulty level of the implant treatment is known before the treatment, it is possible to decrease a risk for damage of the mandibular canal in the implant treatment. This will be described below with reference to FIGS. 18A to 20B.

Figure 18A:
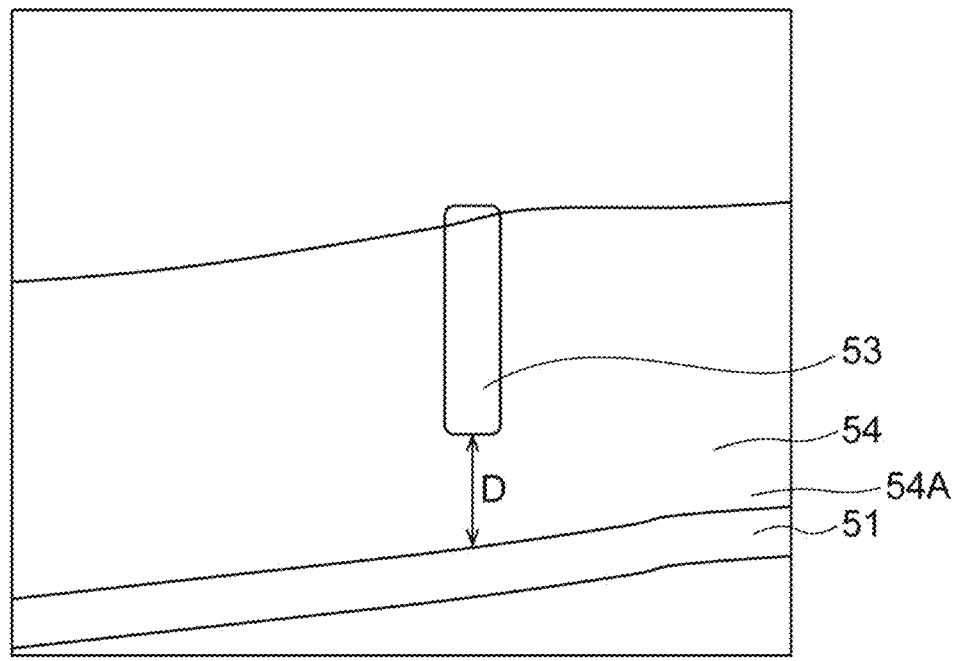
FIGS. 18A and 18B are diagrams illustrating applications to an implant treatment.
Figure 18B:
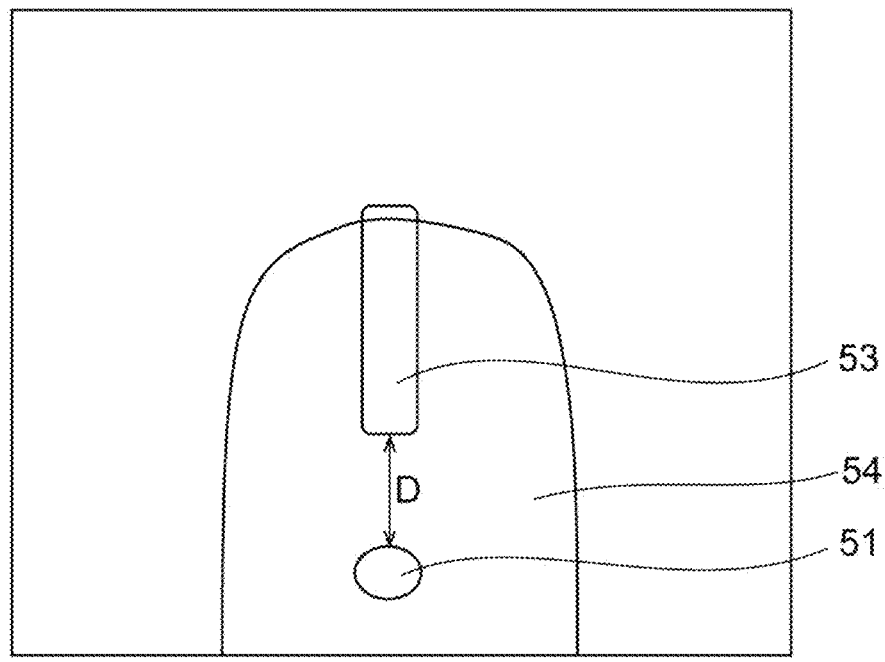

In FIGS. 18A and 18B, a mandibular canal 51 as a biologically important region and a virtual implant 53 are exemplified, respectively. The mandibular canal 51 is located inside a biologically normal region 54. The virtual implant 53 is located with respect to the mandibular canal 51 so as to be inserted into the biologically normal region 54 so that both take distance between them at a region of non-interest 54A. An inter-element distance D is a distance between the mandibular canal 51 and the virtual implant 53. In this example, the deepest part of the virtual implant 53 is located closest to the mandibular canal 51, and a distance therefrom to the mandibular canal 51 is the inter-element distance D. The location of the virtual implant 53 can be determined by operation of the user U3.

Figure 19A:
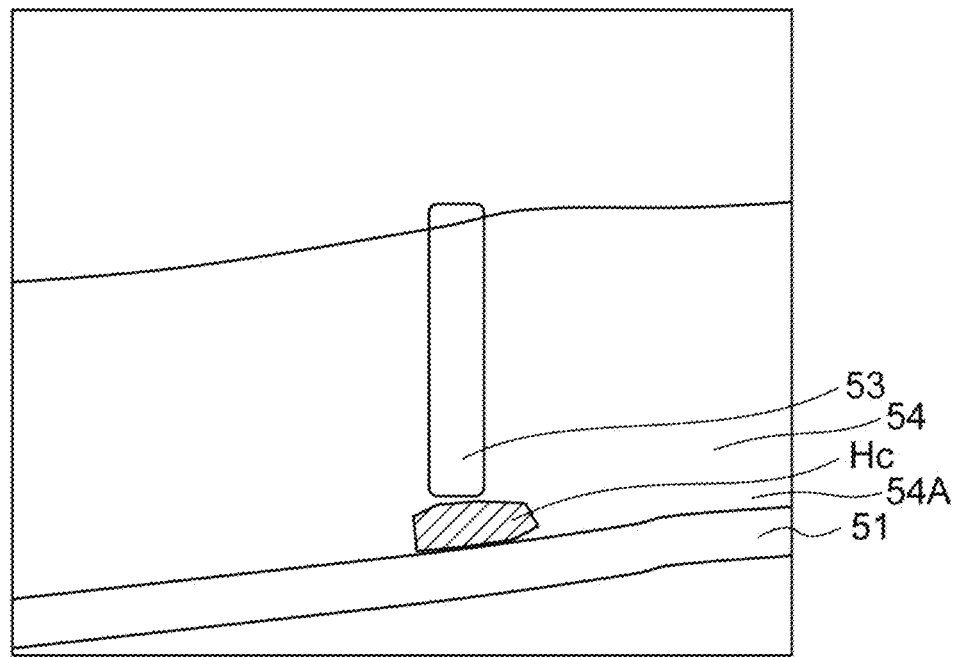
FIGS. 19A and 19B are diagrams illustrating applications to an implant treatment.
Figure 19B:
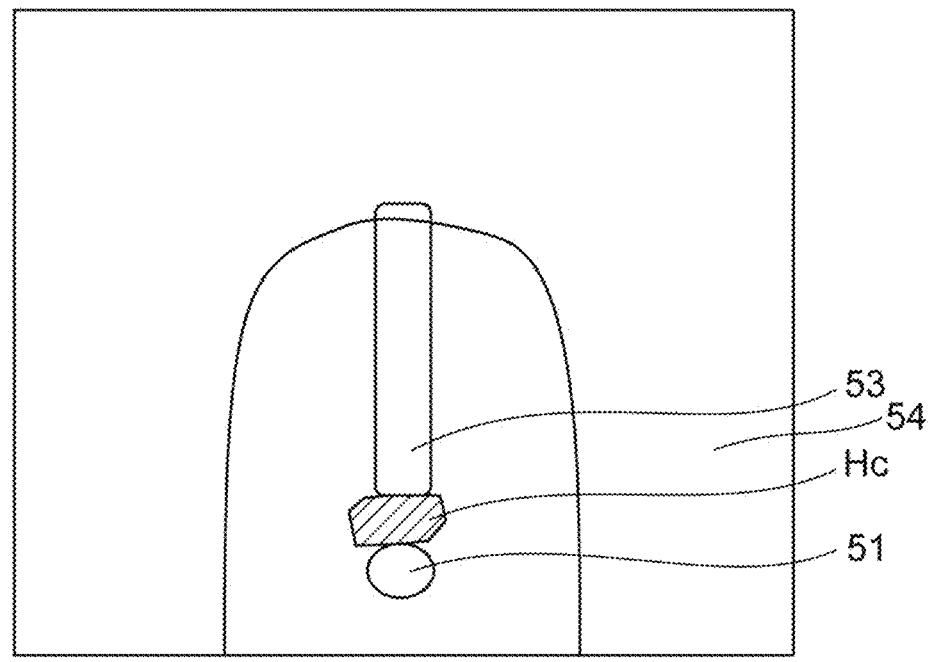

In the example illustrated in FIGS. 19A and 19B, the inter-element distance is relatively shorter. A region Hc between the mandibular canal 51 and the virtual implant 53 is displayed in a heat map.

Figure 20A:
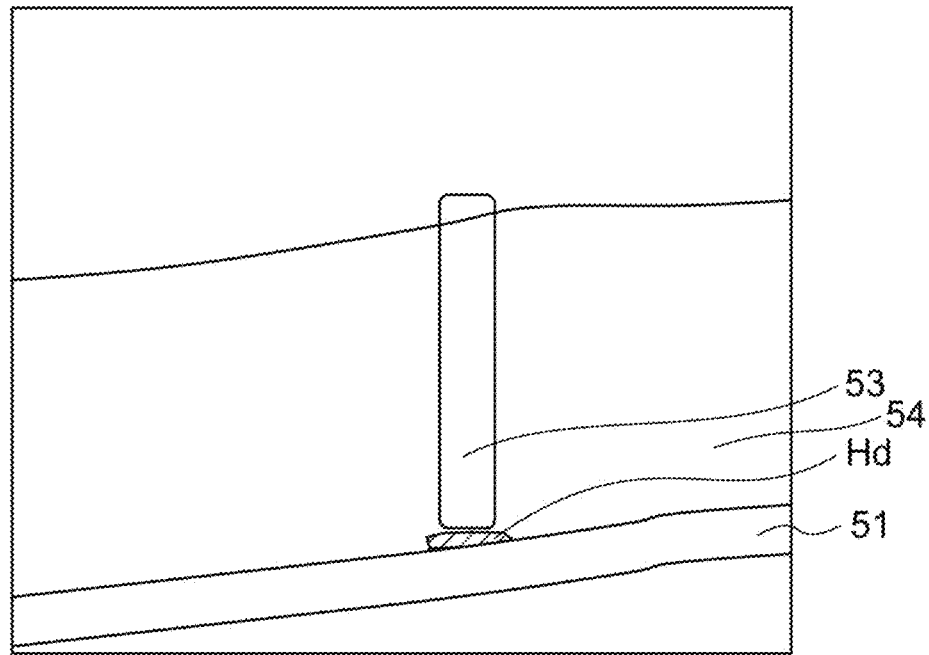
FIGS. 20A and 20B are diagrams illustrating applications to an implant treatment.
Figure 20B:
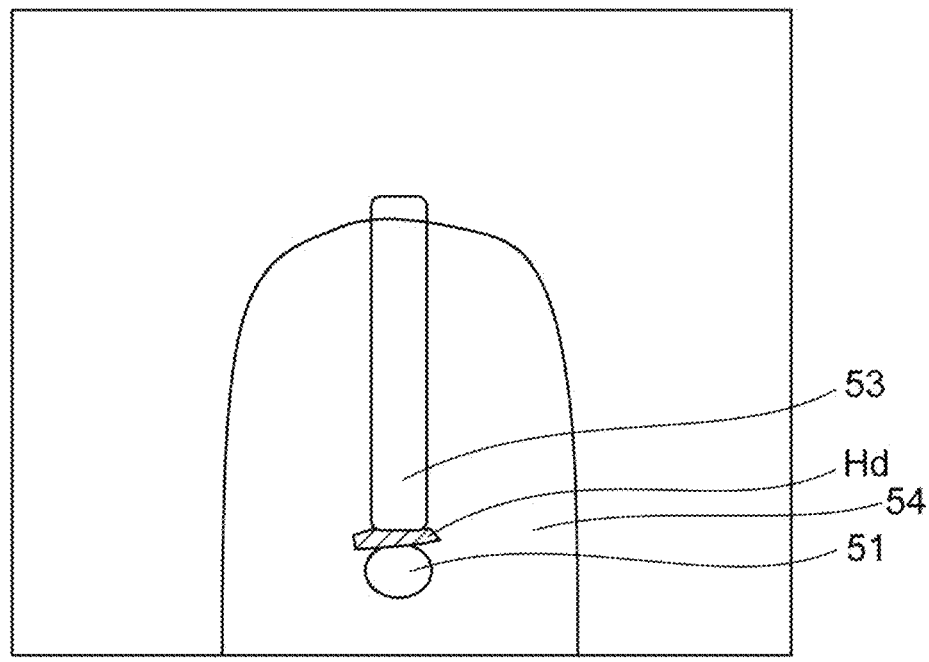

In the example illustrated in FIGS. 20A and 20B, the inter-element distance is further shorter in comparison with the example illustrated in FIGS. 19A and 19B. A region Hd between the mandibular canal 51 and the virtual implant 53 is displayed in a heat map. The heat map indicating the region Hd may be emphasized more than the heat map indicating the region Hc (see FIGS. 19A and 19B).

The segmentation device 3 may present a drill which is to be used for punching a jawbone for insertion of an implant, a punching depth, a punching direction, and the like. For example, the segmentation device 3 may present a recommended drill which is suitable for punching for insertion of the selected implant. A punching depth and a punching direction may be presented in consideration of approach of the mandibular canal (for example, with a predetermined margin) in advance.

The segmentation device 3 may be configured to recommend candidates out of virtual implants in a library on the basis of a scheduled insertion position of an implant, coordinates of the mandibular canal, a distance from the mandibular canal to a top of alveolar bone, a thickness of cortical bone, a bone density, a cancellous bone structure, a CT value, an occlusal load of the scheduled insertion position which is stored in the library, and the like. In addition, the segmentation device 3 may be configured to automatically dispose a virtual implant at an optimal position.

The segmentation device 3 described above may be defined, for example, to additionally have the following configurations.

The calculation unit 34 may calculate a difficulty level of an implant treatment or a difficulty level of tooth extraction in accordance with the inter-element distance. Accordingly, it is possible to understand a difficulty level of an implant treatment or a difficulty level of tooth extraction.

Information of an implant may be additionally input to the input unit 32, and the calculation unit 34 may calculate a distance between the implant and the biologically important region when the implant is implanted on the basis of the information of the implant input to the input unit 32. The distance calculated in this way can be used as a matter for determination of an implant treatment.

The output unit 38 may issue an alarm when a position of the implant when the implant is implanted is close to the biologically important region or overlaps the biologically important region. Accordingly, it is possible to notify of a risk of an implant treatment.

The output unit 38 may present information of an implant which is usable based on a result of calculation from the calculation unit 34. Accordingly, it is possible to propose an implant which is suitable for an implant treatment.

The calculation unit 34 may additionally generate an image of a biologically normal region, and the output unit 38 may present a synthetic image of the image of the biologically normal region generated by the calculation unit 34 and an image of the segmentation data of the biologically important region. Accordingly, an image in which both a biologically normal region and a biologically important region are presented can be used as a matter for determination of an implant treatment.

The input unit 32 may receive an input of a user's operation of designating a treatment target position, the output unit 38 may present an indicator of the treatment target position in the image of the constituent maxillofacial region in accordance with the designated treatment target position, and the calculation unit 34 may be configured to calculate a positional relationship between the biologically important region and the indicator of the treatment target position. Accordingly, a positional relationship between a treatment target position designated by a user and a biologically important region can be used as a matter for determination of an implant treatment.

The input unit 32 may receive an operation of moving the indicator. Accordingly, it is possible to easily change an indicator of a treatment target position.

The indicator of the treatment target position may be an indicator of an implant. Accordingly, it is possible to calculate a positional relationship between a biologically important region and an implant.

The calculation unit 34 may calculate a distance between the indicator of the treatment target position and the biologically important region as the inter-element distance. Accordingly, it is possible to calculate a specific distance between a treatment target position and a biologically important region.

The output unit 38 may issue an alarm when the indicator of the treatment target position is close to the biologically important region by less than the inter-element distance or overlaps the biologically important region. Accordingly, it is possible to notify of a risk of an implant treatment.

The output unit 38 may present information of an implant which is usable based on the result of calculation from the calculation unit. Accordingly, it is possible to propose an implant which is suitable for an implant treatment.

What is claimed is:

1. A segmentation device comprising:
    an input interface configured to receive an input of data of a constituent maxillofacial region which is a maxillofacial part or a partial region of the maxillofacial part;
    a processor configured to perform segmentation of a biologically important region using the data of the constituent maxillofacial region input to the input interface and a previously generated learning model, and to calculate a three-dimensional position of the biologically important region in the constituent maxillofacial region; and
    an output interface configured to output information based on a result of calculation from the processor,
    wherein the learning model is a learning model which is generated using training data such that segmentation data of the biologically important region is output when the data of the constituent maxillofacial region is input,
    the data of the constituent maxillofacial region is image data which is acquired by an X-ray CT scan or an MRI scan of the constituent maxillofacial region,
    the biologically important region is at least one region of blood vessels, neural tubes, and a mandibular canal passing through the constituent maxillofacial region and a biological tissue passing through the mandibular canal,
    information of an implant is additionally input to the input interface,
    the processor is configured to calculate a distance between the implant and the biologically important region when the implant is implanted based on the information of the implant input to the input interface, and
    the output interface is configured to issue an alarm when a position of the implant when the implant is implanted is close to the biologically important region or overlaps the biologically important region.

2. The segmentation device according to claim 1, wherein the learning model is a learning model which is generated using the training data such that segmentation data of a region of interest in a biologically normal region which is a region outside of the biologically important region in the constituent maxillofacial region is additionally output when the data of the constituent maxillofacial region is input, and
the processor is configured to perform segmentation of the region of interest.

3. The segmentation device according to claim 2, wherein the processor is configured to calculate three-dimensional positional relationship information between the biologically important region and the region of interest.

4. The segmentation device according to claim 2, wherein the region of interest is at least one region of a tooth region, a region which is occupied by an artifact implanted in the tooth region, a boundary region between a jawbone and the tooth region, a boundary region between the jawbone and the artifact, and an alveolar region, and
the learning model is a learning model which is generated using the training data such that segmentation data of each region of interest is output when the data of the constituent maxillofacial region is input.

5. The segmentation device according to claim 1, wherein the learning model includes:
a first learning model which is generated using first training data such that segmentation data of a tooth region is output when the data of the constituent maxillofacial region is input; and
a second learning model which is generated using second training data such that segmentation data of the biologically important region is output when the data of the constituent maxillofacial region and the segmentation data of the tooth region are input, and
the processor is configured to acquire the segmentation data of the tooth region using the data of the constituent maxillofacial region input to the input interface and the first learning model, and to perform segmentation of the biologically important region using the acquired segmentation data of the tooth region, the data of the constituent maxillofacial region input to the input interface, and the second learning model.

6. The segmentation device according to claim 5, wherein the second learning model is a learning model which is generated using the second training data such that the segmentation data of the biologically important region is output when at least one of a panoramic tomographic image along a curve of a dental arch and a cross-section image crossing the curve is input, and
the processor is configured to set a spline curve for the segmentation data of the tooth region acquired using the first learning model, to generate at least one of a panoramic tomographic image along the set spline curve and a cross-section image crossing the set spline curve, and to perform segmentation of the biologically important region using the generated image and the second learning model.

7. The segmentation device according to claim 3, wherein the processor is configured to calculate a distance between the region of interest and the biologically important region as an inter-element distance.

8. The segmentation device according to claim 7, wherein the output interface is configured to display information of the inter-element distance calculated by the processor.

9. The segmentation device according to claim 7, wherein the learning model includes a third learning model which is generated using third training data such that the inter-element distance is output when the segmentation data of a tooth region and the segmentation data of the biologically important region are input, and
the processor is configured to calculate the inter-element distance using the segmentation data of the tooth region, the segmentation data of the biologically important region, and the third learning model.

10. The segmentation device according to claim 8, wherein the processor is configured to calculate a difficulty level of an implant treatment or a difficulty level of tooth extraction in accordance with the inter-element distance.

11. The segmentation device according to claim 1, wherein the output interface is configured to present information of an implant which is usable based on a result of calculation from the processor.

12. The segmentation device according to claim 1, wherein the processor is configured to additionally generate an image of a biologically normal region which is a region out of the biologically important region in the constituent maxillofacial region, and
the output interface is configured to present a synthetic image of the image of the biologically normal region generated by the processor and an image of the segmentation data of the biologically important region.

13. The segmentation device according to claim 12, wherein the input interface is configured to receive an input of a user's operation of designating a treatment target position,
the output interface is configured to present an indicator of the treatment target position in an image of the constituent maxillofacial region in accordance with the designated treatment target position, and
the processor is configured to calculate a positional relationship between the biologically important region and the indicator of the treatment target position.

14. The segmentation device according to claim 13, wherein the input interface is configured to receive an operation of moving the indicator.

15. The segmentation device according to claim 13, wherein the indicator of the treatment target position is an indicator of an implant.

16. The segmentation device according to claim 13, wherein the processor is configured to calculate a distance between the indicator of the treatment target position and the biologically important region as an inter-element distance.

17. A segmentation device comprising:
an input interface configured to receive an input of data of a constituent maxillofacial region which is a maxillofacial part or a partial region of the maxillofacial part;
a processor configured to perform segmentation of a biologically important region using the data of the constituent maxillofacial region input to the input interface and a previously generated learning model, and to calculate a three-dimensional position of the biologically important region in the constituent maxillofacial region; and
an output interface configured to output information based on a result of calculation from the processor,
wherein the learning model is a learning model which is generated using training data such that segmentation data of the biologically important region is output when the data of the constituent maxillofacial region is input, the data of the constituent maxillofacial region is image data which is acquired by an X-ray CT scan or an MRI scan of the constituent maxillofacial region, the biologically important region is at least one region of blood vessels, neural tubes, and a mandibular canal passing through the constituent maxillofacial region and a biological tissue passing through the mandibular canal, the processor is configured to additionally generate an image of a biologically normal region which is a region out of the biologically important region in the constituent maxillofacial region, the output interface is configured to present a synthetic image of the image of the biologically normal region generated by the processor and an image of the segmentation data of the biologically important region, the input interface is configured to receive an input of a user's operation of designating a treatment target position, the output interface is configured to present an indicator of the treatment target position in an image of the constituent maxillofacial region in accordance with the designated treatment target position, the processor is configured to calculate a positional relationship between the biologically important region and the indicator of the treatment target position, the processor is configured to calculate a distance between the indicator of the treatment target position and the biologically important region as an inter-element distance, the processor is configured to compare the inter-element distance with a preset threshold value for determining whether the indicator of the treatment target position is located in a caution region being close to the biologically important region or overlapping the biologically important region, and the output interface is configured to issue an alarm when the indicator of the treatment target position is determined to be in the caution region.

18. The segmentation device according to claim 17, wherein the output interface is configured to present information of an implant which is usable based on the result of calculation from the processor.

19. A segmentation device comprising:

an input interface configured to receive an input of data of a constituent maxillofacial region which is a maxillofacial part or a partial region of the maxillofacial part;

a processor configured to perform segmentation of a biologically important region using the data of the constituent maxillofacial region input to the input interface and a previously generated learning model, and to calculate a three-dimensional position of the biologically important region in the constituent maxillofacial region; and an output interface configured to output information based on a result of calculation from the processor, wherein the learning model is a learning model which is generated using training data such that segmentation data of the biologically important region is output when the data of the constituent maxillofacial region is input, the data of the constituent maxillofacial region is image data which is acquired by an X-ray CT scan or an MRI scan of the constituent maxillofacial region, the biologically important region is at least one region of blood vessels, neural tubes, and a mandibular canal passing through the constituent maxillofacial region and a biological tissue passing through the mandibular canal, the learning model is a learning model which is generated using the training data such that segmentation data of a region of interest in a biologically normal region which is a region outside of the biologically important region in the constituent maxillofacial region is additionally output when the data of the constituent maxillofacial region is input, the processor is configured to perform segmentation of the region of interest, the processor is configured to calculate three-dimensional positional relationship information between the biologically important region and the region of interest, the processor is configured to calculate a distance between the region of interest and the biologically important region as an inter-element distance, the output interface is configured to display information of the inter-element distance calculated by the processor, and the processor is configured to calculate a difficulty level of an implant treatment or a difficulty level of tooth extraction in accordance with the inter-element distance.

* * * * *